US012645207B2

(12) United States Patent
 Katsuki et al.

(10) Patent No.: US 12,645,207 B2
(45) Date of Patent: Jun. 2, 2026

(54) PRODUCTION MANAGEMENT SYSTEM, PRODUCTION MANAGEMENT METHOD, AND NON-TRANSITORY COMPUTER READABLE MEDIUM

(71) Applicants: Yokogawa Manufacturing Corporation, Tokyo (JP); Yokogawa Electric Corporation, Tokyo (JP)

(72) Inventors: Masato Katsuki, Tokyo (JP); Keiji Sato, Tokyo (JP); Eiji Taya, Tokyo (JP); Tsutomu Niho, Tokyo (JP); Makoto Endo, Tokyo (JP); Toshiya Yamashita, Tokyo (JP); Akifumi Inomata, Tokyo (JP); Fumihiro Saito, Tokyo (JP)

(73) Assignees: Yokogawa Manufacturing Corporation, Tokyo (JP); Yokogawa Electric Corporation, Tokyo (JP)

( * ) Notice: Subject to any disclaimer, the term of this patent is extended or adjusted under 35 U.S.C. 154(b) by 444 days.

(21) Appl. No.: 18/014,749

(22) PCT Filed: Aug. 19, 2021

(86) PCT No.: PCT/JP2021/030284
 § 371 (c)(1),
 (2) Date: Jan. 6, 2023

(87) PCT Pub. No.: WO2022/054520
 PCT Pub. Date: Mar. 17, 2022

(65) Prior Publication Data
 US 2023/0280731 A1 Sep. 7, 2023

(30) Foreign Application Priority Data
 Sep. 10, 2020 (JP) ................................. 2020-152373

(51) Int. Cl.
 *G05B 19/418* (2006.01)

(52) U.S. Cl.
 CPC .............................. *G05B 19/41875* (2013.01)

(58) Field of Classification Search
 None
 See application file for complete search history.

(56) References Cited

U.S. PATENT DOCUMENTS

| | | | | |
|---|---|---|---|---|
| 4,847,795 A | * | 7/1989 | Baker | ................. G06F 11/2257 706/45 |
| 4,901,242 A | * | 2/1990 | Kotan | .............. G05B 19/41875 700/121 |

(Continued)

FOREIGN PATENT DOCUMENTS

| | | |
|---|---|---|
| JP | H06333791 A | 12/1994 |
| JP | H086605 A | 1/1996 |

(Continued)

OTHER PUBLICATIONS

Reconsideration Report by Examiner before Appeal for counterpart Japanese Application No. 2020-152373, drafted from the Japanese Patent Office on Nov. 28, 2023.

(Continued)

*Primary Examiner* — Jason Lin

(57) ABSTRACT

Provided is a production management system including: an operational data acquisition unit for acquiring operational data regarding a production element in a target production process as a target among a plurality of production processes for producing a product from a material; a quality data acquisition unit for acquiring, as quality data indicating quality of a target product, feedback data for evaluating the production element in the target production process based on quality of a downstream product in the target production process, the feedback data being output from a production management system for managing a downstream production process of producing the downstream product by using, as a material, the target product; an analysis unit for analyzing (Continued)

the operational feedback data; and a control information decision unit for deciding control information for controlling the production element in the target production process based on an analysis result.

17 Claims, 14 Drawing Sheets

(56)                    References Cited

U.S. PATENT DOCUMENTS

| | | | | |
|---|---|---|---|---|
| 5,239,487 | A * | 8/1993 | Horejsi | G06Q 10/06 |
| | | | | 706/916 |
| 5,533,093 | A * | 7/1996 | Horton | H04M 3/247 |
| | | | | 379/27.01 |
| 7,577,486 | B2 * | 8/2009 | Toyofuku | G06Q 10/10 |
| | | | | 707/999.102 |
| 8,019,456 | B2 * | 9/2011 | Soga | G06Q 50/04 |
| | | | | 700/110 |
| 8,069,074 | B2 * | 11/2011 | Toyofuku | G06Q 10/0631 |
| | | | | 705/7.26 |
| 10,726,031 | B2 * | 7/2020 | Raj | G06F 16/951 |
| 11,144,038 | B2 * | 10/2021 | Stump | G05B 23/0289 |
| 2004/0122698 | A1 | 6/2004 | Kawahara | |
| 2004/0225391 | A1 * | 11/2004 | Fromherz | G06Q 10/06 |
| | | | | 700/100 |
| 2006/0149407 | A1 * | 7/2006 | Markham | G06Q 10/087 |
| | | | | 700/108 |
| 2006/0199286 | A1 * | 9/2006 | Sato | H01L 22/20 |
| | | | | 257/E21.525 |
| 2006/0282189 | A1 * | 12/2006 | Akisawa | G05B 19/41865 |
| | | | | 700/110 |
| 2007/0059838 | A1 * | 3/2007 | Morrison | F25J 3/0247 |
| | | | | 436/55 |
| 2011/0258478 | A1 * | 10/2011 | Anand | G06Q 10/06 |
| | | | | 714/1 |
| 2015/0100940 | A1 * | 4/2015 | Mockus | G06F 8/70 |
| | | | | 717/101 |
| 2015/0352612 | A1 | 12/2015 | Jinnai | |
| 2018/0136633 | A1 * | 5/2018 | Small | G06Q 20/4014 |

| | | | | |
|---|---|---|---|---|
| 2019/0018397 | A1 * | 1/2019 | Shiba | G05B 19/41865 |
| 2019/0129402 | A1 | 5/2019 | Kono | |
| 2019/0219521 | A1 * | 7/2019 | Mori | G01N 23/04 |
| 2019/0227529 | A1 * | 7/2019 | Iida | G05B 19/418 |
| 2020/0159197 | A1 | 5/2020 | Horiwaki | |

FOREIGN PATENT DOCUMENTS

| | | | |
|---|---|---|---|
| JP | H08267344 A | | 10/1996 |
| JP | 2002109138 A | | 4/2002 |
| JP | 2002251211 A | * | 9/2002 |
| JP | 2004145521 A | | 5/2004 |
| JP | 2006172014 A | * | 6/2006 |
| JP | 2006343952 A | | 12/2006 |
| JP | 2007257621 A | | 10/2007 |
| JP | 2008028032 A | | 2/2008 |
| JP | 2011107882 A | * | 6/2011 |
| JP | 2011157590 A | | 8/2011 |
| JP | 2011258113 A | | 12/2011 |
| JP | 2016177794 A | | 10/2016 |
| JP | 2018005588 A | * | 1/2018 |
| JP | 2019101682 A | | 6/2019 |
| JP | 2020086784 A | | 6/2020 |
| WO | 2014118989 A1 | | 8/2014 |

OTHER PUBLICATIONS

Office Action issued for counterpart Japanese Application No. 2020-152373, issued by the Japanese Patent Office on Feb. 21, 2023 (drafted on Feb. 14, 2023).

International Search Report and (ISA/237) Written Opinion of the International Search Authority for International Patent Application No. PCT/JP2021/030284, mailed by the Japan Patent Office on Oct. 26, 2021.

Office Action issued for counterpart Japanese Application No. 2020-152373, issued by the Japanese Patent Office on Sep. 13, 2022 (drafted on Sep. 9, 2022).

Office Action issued for counterpart Japanese Application No. 2020-152373, transmitted from the Japanese Patent Office on Jul. 18, 2023 (drafted on Jul. 11, 2023).

* cited by examiner

| TARGET PRODUCT LOT | OPERATIONAL DATA | | | | QUALITY DATA | | | |
|---|---|---|---|---|---|---|---|---|
| | "MATERIAL" | "MACHINE" | "METHOD" | "MAN" | ITEM 1 | ITEM 2 | ITEM 3 | FB |
| #1 | PROPERTY OF SURFACE COATING AGENT X / PROPERTY OF SOLVENT Y / PROPERTY OF PET FILM Z | ⋮ | ⋮ | ⋮ | P | P | 100.1 | 100 |
| #2 | PROPERTY OF SURFACE COATING AGENT X / PROPERTY OF SOLVENT Y / PROPERTY OF PET FILM Z | ⋮ | ⋮ | ⋮ | P | P | 99.9 | 75 |
| #3 | PROPERTY OF SURFACE COATING AGENT X / PROPERTY OF SOLVENT Y / PROPERTY OF PET FILM Z | ⋮ | ⋮ | ⋮ | P | P | 100.2 | 50 |
| #4 | PROPERTY OF SURFACE COATING AGENT X / PROPERTY OF SOLVENT Y / PROPERTY OF PET FILM Z | ⋮ | ⋮ | ⋮ | F | P | 100.1 | - |
| #5 | PROPERTY OF SURFACE COATING AGENT X / PROPERTY OF SOLVENT Y / PROPERTY OF PET FILM Z | ⋮ | ⋮ | ⋮ | P | F | 99.8 | - |
| #6 | PROPERTY OF SURFACE COATING AGENT X / PROPERTY OF SOLVENT Y / PROPERTY OF PET FILM Z | ⋮ | ⋮ | ⋮ | P | P | 110.3 | - |

FIG.4

510 — ACQUIRE OPERATIONAL DATA

520 — ACQUIRE QUALITY DATA

530 — RECORD DATA

540 — ANALYZE DATA

550 — OUTPUT FEEDBACK DATA

| TARGET PRODUCT LOT | OPERATIONAL DATA | | | | QUALITY DATA | | |
| --- | --- | --- | --- | --- | --- | --- | --- |
| | "MATERIAL" | "MACHINE" | "METHOD" | "MAN" | ITEM 1 | ITEM 2 | FB |
| #A | PROPERTY OF NMPI | ⋮ | ⋮ | ⋮ | P | 200 | 100 |
| | PROPERTY OF ADDITIVE B | | | | | | |
| #B | PROPERTY OF NMPI | ⋮ | ⋮ | ⋮ | P | 199 | 80 |
| | PROPERTY OF ADDITIVE B | | | | | | |
| #C | PROPERTY OF NMPI | ⋮ | ⋮ | ⋮ | P | 202 | 100 |
| | PROPERTY OF ADDITIVE B | | | | | | |
| #D | PROPERTY OF NMPI | ⋮ | ⋮ | ⋮ | P | 201 | 60 |
| | PROPERTY OF ADDITIVE B | | | | | | |
| #E | PROPERTY OF NMPI | ⋮ | ⋮ | ⋮ | P | 196 | 99 |
| | PROPERTY OF ADDITIVE B | | | | | | |
| #F | PROPERTY OF NMPI | ⋮ | ⋮ | ⋮ | F | 202 | — |
| | PROPERTY OF ADDITIVE B | | | | | | |
| #G | PROPERTY OF NMPI | ⋮ | ⋮ | ⋮ | P | 43 | — |
| | PROPERTY OF ADDITIVE B | | | | | | |

*FIG.7*

810 — ACQUIRE OPERATIONAL DATA

820 — ACQUIRE QUALITY DATA

830 — RECORD DATA

840 — ANALYZE DATA

850 — DECIDE CONTROL INFORMATION

| SEQUENCE | 1 | 2 | 3 | 4 |
|---|---|---|---|---|
| PRODUCTION MANAGEMENT SYSTEM ID | 100a | UNREGISTERED | 100c | 100d |
| PROVISION PERMISSION INFORMATION | – | UNREGISTERED | ○ | × |

*FIG.10*

PRODUCTION MANAGEMENT SYSTEM, PRODUCTION MANAGEMENT METHOD, AND NON-TRANSITORY COMPUTER READABLE MEDIUM

CROSS-REFERENCE TO RELATED APPLICATIONS

This application is a National Stage Entry of International Application No. PCT/JP2021/030284 filed on Aug. 19, 2021, which claims priority to Japanese Patent Application No. 2020-152373 filed on Sep. 10, 2020, the contents of each of which are hereby incorporated by reference in their entirety.

BACKGROUND

1. Technical Field

The present invention relates to a production management system, a production management method, and a non-transitory computer readable medium.

2. Related Art

In the Patent Document 1, "a manufacturing process analyzing method for specifying an inhibiting factor causing a variation of product performance and for stabilizing the product performance" is described.

CITATION LIST

Patent Document

Patent Document 1: Japanese Patent Application Publication No. 2016-177794 GENERAL DISCLOSURE

Item 1

A first aspect of the present invention provides a production management system. The production management system may include an operational data acquisition unit configured to acquire operational data regarding a production element in a target production process as a target among a plurality of production processes for producing a product from a material. The production management system may include a quality data acquisition unit configured to acquire, as quality data indicating quality of a target product which is a product of the target production process, feedback data for evaluating the production element in the target production process on a basis of quality of a downstream product in the target production process, the feedback data being output from a production management system configured to manage a downstream production process of producing the downstream product by using the target product as a material. The production management system may include an analysis unit configured to analyze the operational data and the feedback data. The production management system may include a control information decision unit configured to decide control information for controlling the production element in the target production process on the basis of an analysis result.

Item 2

The analysis unit may be configured to estimate a relationship between a change in the operational data and a change in the feedback data, and the control information decision unit is configured to decide the control information on a basis of the relationship estimated by the analysis unit.

Item 3

The control information decision unit may be configured to predict, on a basis of the relationship estimated by the analysis unit, the feedback data in a case where the control information is changed, and decide the control information on the basis of a prediction result.

Item 4

The control information decision unit may be configured to decide the control information to reduce a cost related to an operation of the target production process within a range in which the feedback data predicted by the control information decision unit satisfies a predetermined standard.

Item 5

The control information decision unit may be configured to decide the control information to reduce an energy consumption amount related to an operation of the target production process within a range in which the feedback data predicted by the control information decision unit satisfies a predetermined standard.

Item 6

The production management system may further include a control unit configured to control the production element in the target production process on a basis of the control information decided by the control information decision unit.

Item 7

The feedback data may include information indicating a yield of the downstream product caused by the target product specified as a cause of deterioration in the quality of the downstream product.

Item 8

The quality data acquisition unit may be further configured to acquire, as the quality data, an evaluation result of the quality of the target product evaluated in the target production process.

Item 9

The analysis unit may be further configured to analyze the operational data and the quality data to estimate an influence, which is caused by an upstream product, on the quality of the target product, the upstream product being a product of an upstream production process which is an upstream process of the target production process and serving as a material in the target production process.

Item 10

The production management system may further include a feedback unit configured to output, on a basis of an analysis result, feedback data for evaluating a production element in the upstream production process on a basis of the quality of the target product in the upstream production process.

(Item 11) The analysis unit may be further configured to analyze the operational data and the quality data to estimate an influence, which is caused by an operation in the target production process, on the quality of the target product.

Item 12

A second aspect of the present invention provides a production management method. The production management method may include acquiring operational data regarding a production element in a target production process as a target among a plurality of production processes for producing a product from a material. The production management method may include acquiring, as quality data indicating quality of a target product which is a product of the target production process, feedback data for evaluating the production element in the target production process on a basis of quality of a downstream product in the target production process, the feedback data being output from a production management system configured to manage a downstream production process of producing the downstream product by using the target product as a material. The production management method may include analyzing the operational data and the feedback data. The production management method may include deciding control information for controlling the production element in the target production process on the basis of an analysis result.

Item 13

A third aspect of the present invention provides a non-transitory computer readable medium having stored thereon a production management program. The production management program may be executed by a computer. The production management program may cause the computer to function as an operational data acquisition unit configured to acquire operational data regarding a production element in a target production process as a target among a plurality of production processes for producing a product from a material. The production management program may cause the computer to function as a quality data acquisition unit configured to acquire, as quality data indicating quality of a target product which is a product of the target production process, feedback data for evaluating the production element in the target production process on a basis of quality of a downstream product in the target production process, the feedback data being output from a production management system configured to manage a downstream production process of producing the downstream product by using the target product as a material. The production management program may cause the computer to function as an analysis unit configured to analyze the operational data and the feedback data. The production management program may cause the computer to function as a control information decision unit configured to decide control information for controlling the production element in the target production process on the basis of an analysis result.

The summary clause does not necessarily describe all necessary features of the embodiments of the present invention. The present invention may also be a sub-combination of the features described above.

BRIEF DESCRIPTION OF THE DRAWINGS

FIG. 4 illustrates an example of data recorded by the production management system 100c according to the present embodiment.

FIG. 7 illustrates an example of data recorded by the production management system 100b according to the present embodiment.

FIG. 10 illustrates an example of data registered by the integrated management system 200 according to the present embodiment.

DESCRIPTION OF EXEMPLARY EMBODIMENTS

Hereinafter, the present invention will be described through embodiments of the invention, but the following embodiments do not limit the invention according to claims. In addition, not all of the combinations of features described in the embodiments are essential to the solving means of the invention.

Figure 1:
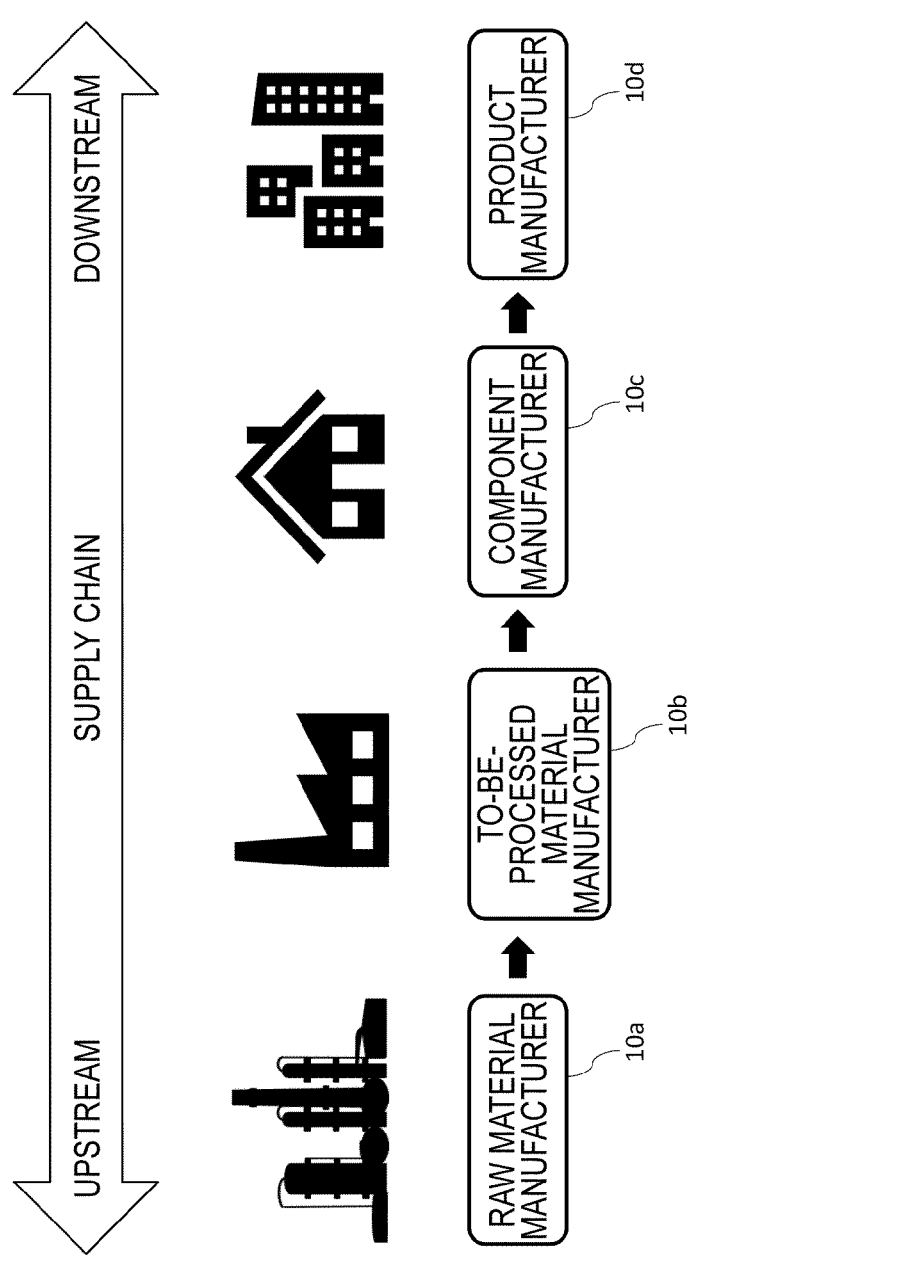
FIG. 1 illustrates an example of a general model of a supply chain.

FIG. 1 illustrates an example of a general model of a supply chain. For example, tangible objects such as automobiles, electrical appliances, clothing, and foods have a common flow from production to sales, that is, a chain of supply. This is referred to as a supply chain. The supply chain includes a plurality of production processes for producing a product from materials. As an example, the supply chain may include a raw material manufacturer 10a, a to-be-processed material manufacturer 10b, a component manufacturer 10c, and a product manufacturer 10d (collectively referred to as "manufacturer(s) 10"), as illustrated in this figure.

The raw material manufacturer 10a produces a raw material such as a petroleum product, for example, by using, as a starting raw material, crude oil, natural gas, or the like and supplies the raw material to the to-be-processed material manufacturer 10*b*. The to-be-processed material manufacturer 10*b* produces a to-be-processed material such as a resin material, for example, by using, as a raw material, a petroleum product or the like, which is a product of the raw material manufacturer 10*a*, and supplies the to-be-processed material to the component manufacturer 10*c*. The component manufacturer 10*c* produces a component such as an electronic component, for example, by using, as a source material, a resin material or the like, which is a product of the to-be-processed material manufacturer 10*b*, and supplies the component to the product manufacturer 10*d*. In the product manufacturer 10*d*, for example, components such as electronic components which are products of the component manufacturer 10*c* are assembled to produce a finished product. In this manner, in the supply chain, from upstream to downstream, for example, a plurality of manufacturers 10 such as the raw material manufacturer 10*a*, the to-be-processed material manufacturer 10*b*, the component manufacturer 10*c*, and the product manufacturer 10*d* serve as players and realize a chain of supply.

In such a supply chain, in general, the quality of a product in a downstream production process can also be affected by the quality of a product in an upstream production process. That is, the quality of the finished product which is the product of the product manufacturer 10*d* can also be affected by the quality of the component which is the product of the component manufacturer 10*c*. Similarly, the quality of the component which is the product of the component manufacturer 10*c* can also be affected by the quality of the to-be-processed material which is the product of the to-be-processed material manufacturer 10*b*. Similarly, the quality of the to-be-processed material which is the product of the to-be-processed material manufacturer 10*b* can also be affected by the quality of the raw material which is the product of the raw material manufacturer 10*a*. In the present embodiment, production in a supply chain in which such a quality chain may occur may be subject to management.

Figure 2:
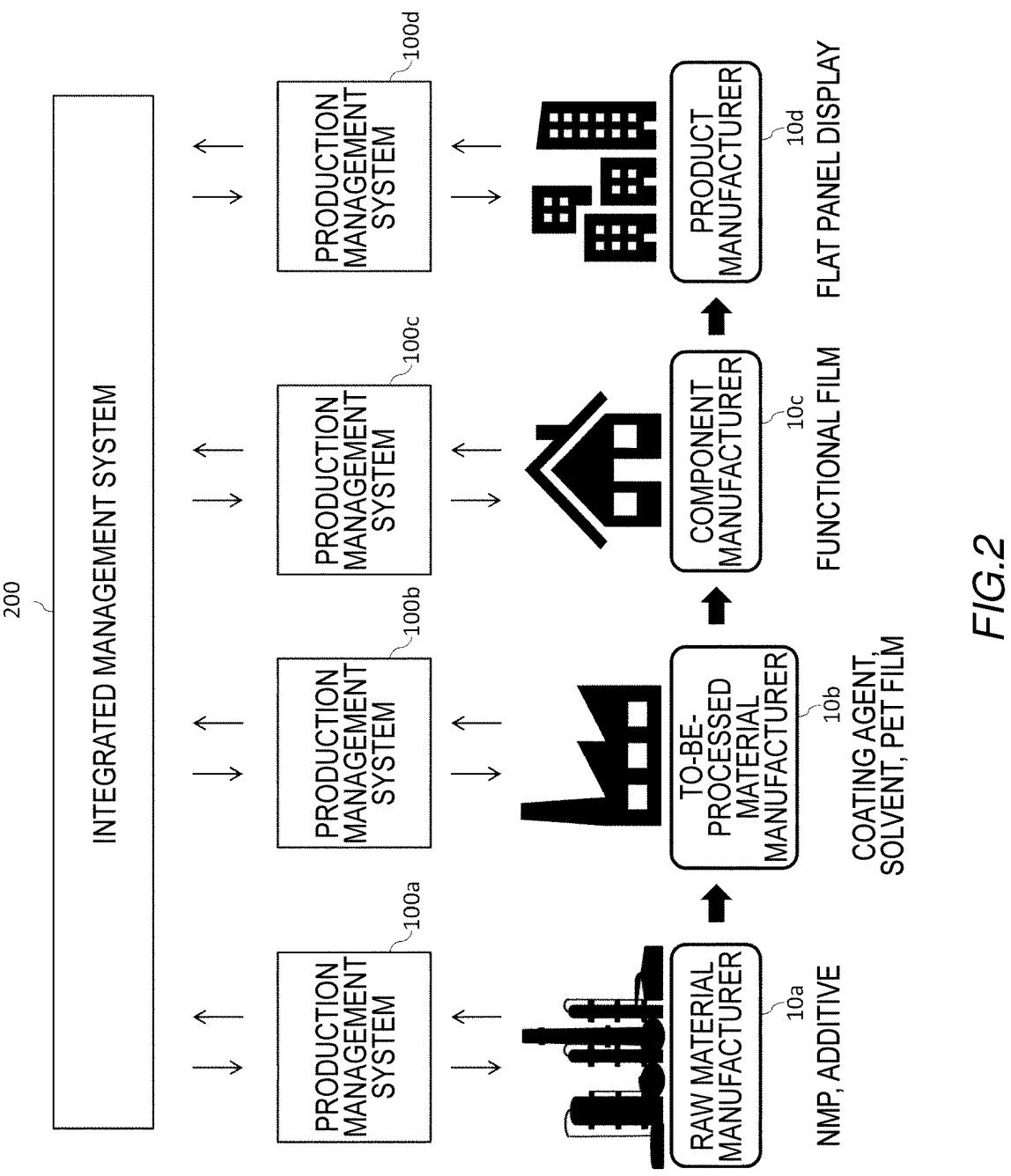
FIG. 2 illustrates an example of a block diagram for managing the supply chain by using a production management system 100 and an integrated management system 200 according to the present embodiment.

FIG. 2 illustrates an example of a block diagram for managing the supply chain by using a production management system 100 and an integrated management system 200 according to the present embodiment. In this figure, a case where the supply chain is managed by using production management systems 100*a*, 100*b*, 100*c*, and 100*d* (collectively referred to as the "production management system(s) 100") and the integrated management system 200 is illustrated as an example.

The production management system 100*a* may be provided, for example, in a facility of the raw material manufacturer 10*a* and may manage a production process in the raw material manufacturer 10*a*. In addition, the production management system 100*b* may be provided, for example, in a facility of the to-be-processed material manufacturer 10*b* and may manage a production process in the to-be-processed material manufacturer 10*b*. In addition, the production management system 100*c* may be provided, for example, in a facility of the component manufacturer 10*c* and may manage a production process in the component manufacturer 10*c*. In addition, the production management system 100*d* may be provided, for example, in a facility of the product manufacturer 10*d* and may manage a production process in the product manufacturer 10*d*.

Then, the integrated management system 200 may be provided on a cloud, for example, and may manage the production of the entire supply chain in cooperation with the production management systems 100*a*, 100*b*, 100*c*, and 100*d*.

In the above description, a case where each production management system 100 is locally provided in the facility of each manufacturer 10 has been described as an example, but the present invention is not limited thereto. Some or all of the production management systems 100 may be provided on a network or may be provided as a system integrated with the integrated management system 200. In addition, in the above description, a case where the integrated management system 200 is provided on the network has been described as an example, but the present invention is not limited thereto. The integrated management system 200 may be locally provided in the facility of any of the manufacturers 10, or may be provided as a system integrated with any of the production management systems 100.

After that, a case where a quality feedback according to the present embodiment is applied to production management between the to-be-processed material manufacturer 10*b* and the component manufacturer 10*c* will be described as an example. That is, a case where the quality is fed back from the production process in the component manufacturer 10*c* on the downstream side to the production process in the to-be-processed material manufacturer 10*b* on the upstream side will be described as an example. However, it is not limited thereto. The quality feedback according to the present embodiment may be applied to production management between any processes in the supply chain, such as between the raw material manufacturer 10*a* and the to-be-processed material manufacturer 10*b* as well as between the component manufacturer 10*c* and the product manufacturer 10*d*, instead of or in addition to the production management between the to-be-processed material manufacturer 10*b* and the component manufacturer 10*c*.

Figure 3:
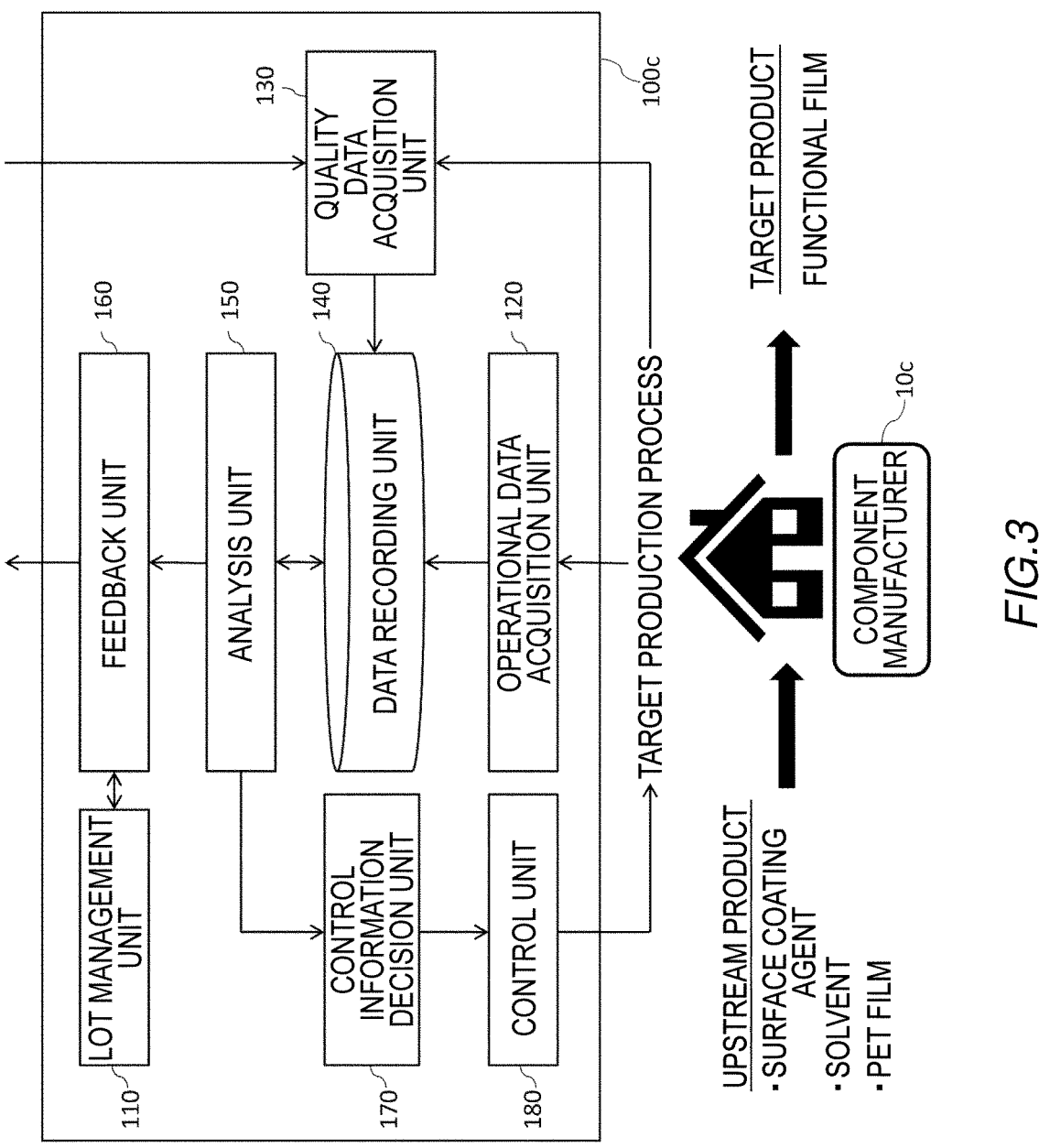
FIG. 3 illustrates an example of a block diagram of a production management system 100c according to the present embodiment.

FIG. 3 illustrates an example of a block diagram of the production management system 100*c* according to the present embodiment. The production management system 100*c* according to the present embodiment acquires and analyzes the operation performance in the target production process. Then, the production management system 100*c* according to the present embodiment estimates the influence, which is caused by an upstream product, on the quality of the target product on the basis of the analysis result, and outputs feedback data for the upstream production process. Note that the production management system 100*c* is an example of the production management system 100 on the downstream side, that is, the side which feeds back the quality in a case where the quality feedback according to the present embodiment is applied to the production management between the to-be-processed material manufacturer 10*b* and the component manufacturer 10*c*. Therefore, when the quality feedback according to the present embodiment is applied to production management between other processes, other production management systems 100 may be configured similarly to the production management system 100*c*.

Herein, the target production process refers to a production process to be managed by the production management system 100. That is, for the production management system 100*a*, the production process in the raw material manufacturer 10*a* is the target production process, for the production management system 100*b*, the production process in the to-be-processed material manufacturer 10*b* is the target production process, for the production management system 100*c*, the production process in the component manufacturer 10*c* is the target production process, and for the production management system 100*d*, the production process in the product manufacturer 10*d* is the target production process. In this figure, since the production management system 100*c* is illustrated, the production process in the component manufacturer 10*c* is the target production process. Herein, the product produced in the target production process is referred to as a target product.

In addition, the upstream production process refers to a process which is immediately prior to the target production process in the supply chain. That is, when the target production process is the production process in the product manufacturer 10*d*, the production process in the component manufacturer 10*c* is the upstream production process, when the target production process is the production process in the component manufacturer 10*c*, the production process in the to-be-processed material manufacturer 10*b* is the upstream production process, and when the target production process is the production process in the to-be-processed material manufacturer 10*b*, the production process in the raw material manufacturer 10*a* is the upstream production process. In this figure, since the production process in the component manufacturer 10*c* is the target production process, the production process in the to-be-processed material manufacturer 10*b* is the upstream production process. Herein, the product produced in the upstream production process is referred to as an upstream product.

In addition, the downstream production process refers to a process which is immediately subsequent to the target production process in the supply chain. That is, when the target production process is the production process in the raw material manufacturer 10*a*, the production process in the to-be-processed material manufacturer 10*b* is the downstream production process, when the target production process is the production process in the to-be-processed material manufacturer 10*b*, the production process in the component manufacturer 10*c* is the downstream production process, and when the target production process is the production process in the component manufacturer 10*c*, the production process in the product manufacturer 10*d* is the downstream production process. In this figure, since the production process in the component manufacturer 10*c* is the target production process, the production process in the product manufacturer 10*d* is the downstream production process. Herein, the product produced in the downstream production process is referred to as a downstream product.

In the present embodiment, the production management system 100*c* is assumed to manage the production process in the component manufacturer 10*c* which produces a "functional film", for example, by using, as main source materials, a "surface coating agent", a "solvent", and a "PET film" supplied from the to-be-processed material manufacturer 10*b* and supplies the "functional film" to the product manufacturer 10*d* which produces a "flat panel display". In this case, the "surface coating agent", the "solvent", and the "PET film" correspond to the upstream products, the "functional film" corresponds to the target product, and the "flat panel display" corresponds to the downstream product.

The production management system 100*c* may be a computer such as a personal computer (PC), a tablet computer, a smartphone, a workstation, a server computer, or a general-purpose computer, or may be a computer system in which a plurality of computers are connected. Such a computer system is also a computer in a broad sense. In addition, the production management system 100*c* may also be implemented by one or more virtual computer environments executable in a computer. Alternatively, the production management system 100*c* may be a dedicated computer designed for management of the production process, or may be dedicated hardware realized by a dedicated circuit. In addition, when the production management system 100*c* can be connected to the Internet, the production management system 100*c* may be realized by cloud computing.

The production management system 100*c* includes a lot management unit 110, an operational data acquisition unit 120, a quality data acquisition unit 130, a data recording unit 140, an analysis unit 150, a feedback unit 160, a control information decision unit 170, and a control unit 180. Note that these blocks are functional blocks that are functionally separated from each other, and do not necessarily have to be matched with actual device configurations. In other words, in this figure, a unit shown by one block does not necessarily have to be configured by one device. Also, in this figure, units shown by separate blocks do not necessarily have to be configured by separate devices.

The lot management unit 110 manages information for identifying the lot of the upstream product and information for identifying the lot of the target product in association with each other. That is, the lot management unit 110 manages which lot in the upstream product has been used as a material to produce a specific lot in the target product in association with each upstream product.

The operational data acquisition unit 120 acquires operational data regarding production elements in a target production process as a target among a plurality of production processes for producing a product from a material. Herein, the production elements are elements for producing the product. Among these production elements, "material", "machine", "method", and "man" are referred to as "four elements of production", which are also referred to as "4M". For example, the operational data acquisition unit 120 may acquire operational data indicating performance regarding "4M" in the target production process in time series.

The operational data acquisition unit 120 may be, for example, a communication unit, and acquires the operational data regarding the production elements in the target production process in time series via a communication network. Such a communication network may be a network which connects a plurality of computers. For example, the communication network may be a global network in which a plurality of computer networks are interconnected, and may be, as an example, the Internet using the Internet protocol, or the like. Instead, the communication network may be realized by a dedicated line. Note that, in the above description, a case where the operational data acquisition unit 120 acquires the operational data via the communication network has been described as an example, but the present invention is not limited thereto. For example, the operational data acquisition unit 120 may acquire the operational data regarding the production elements in the target production process via another means, such as a user input or various memory devices, different from the communication network. The operational data acquisition unit 120 supplies the acquired operational data to the data recording unit 140.

The quality data acquisition unit 130 acquires quality data indicating the quality of a target product which is the product of the target production process. The quality data acquisition unit 130 may acquire the quality data for each lot of the target product. At this time, the quality data acquisition unit 130 may acquire, as the quality data, an evaluation result of the quality of the target product evaluated in the target production process, for example. Alternatively or additionally, the quality data acquisition unit 130 may acquire, as the quality data, feedback data for evaluating the production elements in the target production process on the basis of the quality of the downstream product in the target production process, the feedback data being output from the production management system 100 which manages the downstream production process of producing a downstream product by using the target product as a material. This will be described below in detail.

The quality data acquisition unit 130 may be a communication unit similarly to the operational data acquisition unit 120, and for example, acquires the quality data indicating the quality of the target product for each lot of the target product via the communication network. Note that the quality data acquisition unit 130 may also acquire the quality data indicating the quality of the target product via another means, such as a user input or various memory devices, different from the communication network similarly to the operational data acquisition unit 120. The quality data acquisition unit 130 supplies the acquired quality data to the data recording unit 140.

The data recording unit 140 acquires the operational data supplied from the operational data acquisition unit 120. In addition, the data recording unit 140 acquires the quality data supplied from the quality data acquisition unit 130. Then, the data recording unit 140 records the acquired operational data and quality data in association with each lot of the target product.

The analysis unit 150 accesses the data recording unit 140 and refers to the operational data and the quality data associated with each lot of the target product. Then, the analysis unit 150 analyzes the operational data and the quality data, and estimates the influence, which is caused by each production element, on the quality of the target product. Herein, a plurality of pieces of data in which some or all of the operational data and the quality data are different from one another are recorded in the data recording unit 140. Therefore, the analysis unit 150 can distinguish the influences on the quality of the target product for each production element by comparing and analyzing such a plurality of pieces of data having at least partial difference. That is, the analysis unit 150 can distinguish which one of the "material", the "machine", the "method", and the "man" of "4M" has caused the different results in the quality of the target product.

Then, the analysis unit 150 estimates the influence, which is caused by the operation in the target production process, on the quality of the target product, for example, by estimating that any one of the "machine", the "method", or the "man" of "4M" has caused the different results in the quality of the target product. In this manner, the analysis unit 150 can analyze the operational data and the quality data to estimate the influence, which is caused by the operation in the target production process, on the quality of the target product.

Similarly, the analysis unit 150 estimates the influence, which is caused by the material, that is, the upstream product, on the quality of the target product, for example, by estimating that the "material" of "4M" has caused the different results in the quality of the target product. In this manner, the analysis unit 150 can analyze the operational data and the quality data to estimate the influence, which is caused by the upstream product, on the quality of the target product, the upstream product being the product of the upstream production process which is the upstream process of the target production process and serving as the material in the target production process.

In addition, the analysis unit 150 can further analyze the operational data and the quality data after distinguishing which one of "4M" has caused the different results in the quality of the target product, thereby narrowing down specifically which production element has caused the deterioration in the quality of the target product. For example, the analysis unit 150 can analyze a plurality of pieces of operational data with which different pieces of quality data are associated, to specify the upstream product that has caused the deterioration in the quality of the target product. The analysis unit 150 supplies the analysis result obtained by performing analysis in this manner to the feedback unit 160 and the control information decision unit 170.

On the basis of the analysis result by the analysis unit 150, the feedback unit 160 outputs feedback data for evaluating the production element in the upstream production process on the basis of the quality of the target product in the upstream production process. At this time, the feedback unit 160 may output information for identifying the upstream product specified by the analysis unit 150 as the cause of the deterioration in the quality of the target product. In addition, the feedback unit 160 may output information for identifying the lot of the target product of which the quality is estimated to no longer satisfy a predetermined standard due to the specified upstream product. In addition, the feedback unit 160 may output information for identifying the lot of the upstream product corresponding to the lot of the target product of which the quality is estimated to no longer satisfy the predetermined standard due to the specified upstream product. In addition, the feedback unit 160 may output information indicating the yield of the target product caused by the specified upstream product. This will also be described below in detail.

The control information decision unit 170 decides control information for controlling the production element in the target production process on the basis of the analysis result by the analysis unit 150. As described above, the analysis unit 150 can distinguish the influences on the quality of the target product for each production element. On the basis of such an analysis result by the analysis unit 150, the control information decision unit 170 decides control information for controlling the production element in the target production process to optimize the operation in the target production process. As an example, the control information decision unit 170 may decide control information for controlling the "material", for example, control information regarding the mixing or preprocessing of materials on the basis of the influence, which is caused by the "material", on the quality of the target product. In addition, the control information decision unit 170 may decide control information for controlling the "machine", for example, control information regarding the maintenance of the machine on the basis of the influence, which is caused by the "machine", on the quality of the target product. In addition, the control information decision unit 170 may decide control information for controlling the "method", for example, control information regarding the control of an actuator or the like provided in the machine on the basis of the influence, which is caused by the "method", on the quality of the target product. In addition, the control information decision unit 170 may decide control information for controlling the "man", for example, control information regarding the personnel schedule on the basis of the influence, which is caused by the "man", on the quality of the target product. The control information decision unit 170 outputs the decided control information. At this time, the control information decision unit 170 may display and output the decided control information, or may transmit the control information to another system and output the control information. In addition, the control information decision unit 170 supplies the decided control information to the control unit 180.

The control unit 180 controls the production element in the target production process on the basis of the control information decided by the control information decision unit 170. At this time, when the control information is supplied from the control information decision unit 170, the control unit 180 may actively control the production element in the target production process according to the control information. Alternatively or additionally, the control unit 180 may passively control the production element in the target production process according to an instruction from a worker who has viewed the control information output by the control information decision unit 170.

FIG. 4 illustrates an example of data recorded by the production management system 100c according to the present embodiment. As illustrated in this figure, the production management system 100c records the operational data and the quality data in the data recording unit 140 in association with each lot of the target product.

The production management system 100c may record, as the operational data, each operational data indicating performance regarding "4M", that is, the "material", the "machine", the "method", and the "man" in the target production process, for example. As an example, the production management system 100c may record, as operational data regarding the "material", data obtained by inspecting each of the properties of a "surface coating agent X", a "solvent Y", and a "PET film Z" in the target production process.

In addition, the production management system 100c may record, as the quality data, evaluation results in a plurality of items (item 1, item 2, item 3, and the like) and feedback (FB) data, for example. Herein, the evaluation results for the plurality of items may be the results of evaluating the quality of the target product for the plurality of items in the target production process. That is, the production management system 100c may record, as the quality data, the quality evaluation result of the target product evaluated in the target production process, herein, the "functional film".

As an example, the production management system 100c may record, as the evaluation result, data indicating whether a test has been passed (P: Pass) or failed (F: Fail) as a result of performing the test on the target product in the target production process. In addition, the production management system 100c may record, as the evaluation result, an actual measurement value obtained by measuring the characteristic of the target product in the target production process.

In addition, the production management system 100c may record, as the feedback data, feedback data output from the production management system 100 which manages the downstream production process, for example. As an example, the production management system 100c may record, as the quality data, feedback data output from the production management system 100d which manages the production process in the product manufacturer 10d which assembles components such as the "functional film" which is the target product to produce the "flat panel display" which is the downstream product. Note that, in this figure, a case where the production management system 100c records, as the feedback data, data indicating the yield of the downstream product caused by the target product is illustrated as an example.

That is, in this figure, for example, for lots #1 to #3, a case is illustrated in which as a result of evaluating the target product in the target production process, the item 1 and the item 2 were passed (P) and the item 3 was within a range of the target value (for example, 100±3%), and thus as a result of the target product being supplied from the target production process to the downstream production process, the yield of the downstream product caused by the target product was fed back from the downstream production process. On the other hand, for other lots #4 to #6, a case is illustrated in which as a result of evaluating the target product in the target production process, the item 1 or the item 2 was failed (F) or the item 3 was out of the range of the target value, and thus the target product was not supplied from the target production process to the downstream production process. Note that in this case, there is no feedback data from the downstream production process for these lots.

The production management system 100c according to the present embodiment records, for example, a plurality of pieces of operational data with which different pieces of quality data are associated as illustrated in this figure. Then, the production management system 100c according to the present embodiment analyzes these data, estimates the influence, which is caused by the upstream product, on the quality of the target product, and outputs feedback data for the upstream production process. This will be described in detail by using a flow.

Figure 5:
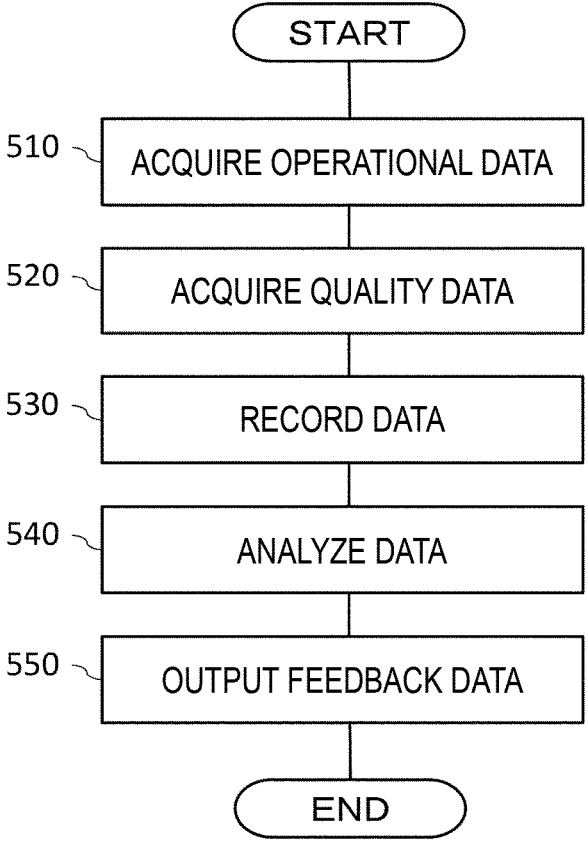
FIG. 5 illustrates an example of a flow in which the production management system 100c according to the present embodiment outputs feedback data.

FIG. 5 illustrates an example of a flow in which the production management system 100c according to the present embodiment outputs the feedback data.

In step 510, the production management system 100c acquires operational data. For example, the operational data acquisition unit 120 acquires, via a communication network, operational data regarding production elements in a target production process as a target among a plurality of production processes for producing a product from a material. As an example, the operational data acquisition unit 120 may acquire, in time series, operational data indicating performance regarding "4M", that is, the "material", the "machine", the "method", and the "man" in the target production process.

For example, the operational data acquisition unit 120 may acquire, as the operational data regarding the "material", inspection data obtained by inspecting the material, that is, an upstream product in the target production process. As an example, the operational data acquisition unit 120 may acquire, as the operational data regarding the "material", data obtained by inspecting each of the properties of the "surface coating agent X", the "solvent Y", and the "PET film Z" in the target production process.

In addition, for example, the operational data acquisition unit 120 may acquire, as the operational data regarding the "machine", data regarding the soundness of the machine in the target production process. As an example, the operational data acquisition unit 120 may acquire, as the operational data regarding the "machine", data indicating a use elapsed time (years), a deterioration degree, a maintenance status, and the like of the machine in the target production process.

In addition, for example, the operational data acquisition unit 120 may acquire, as the operational data regarding the "method", operation data in the target production process. As an example, the operational data acquisition unit 120 may acquire, as the operational data regarding the "method", measurement data from a sensor provided in the machine in the target production process, control data to an actuator, and the like.

In addition, for example, the operational data acquisition unit 120 may acquire, as the operational data regarding the "man", schedule data in the target production process. As an example, the operational data acquisition unit 120 may acquire, as the operational data regarding the "man", data indicating the experience of a worker involved in the target production process, a personnel allocation, and the like. The operational data acquisition unit 120 supplies the acquired operational data to the data recording unit 140.

In step 520, the production management system 100c acquires quality data. For example, the quality data acquisition unit 130 acquires, via the communication network, quality data indicating the quality of the target product, which is the product of the target production process, for each lot of the target product.

Herein, the quality data acquisition unit 130 may acquire, as the quality data, the evaluation result of the quality of the target product evaluated in the target production process. As an example, the quality data acquisition unit 130 may acquire, as a first item (item 1) of the evaluation result, data indicating whether the test has been passed (P) or failed (F) as a result of performing an appearance test on the "functional film" which is the target product in the target production process. In addition, the quality data acquisition unit 130 may acquire, as a second item (item 2) of the evaluation result, data indicating whether the test has been passed (P) or failed (F) as a result of performing a reflectance test on the "functional film" which is the target product in the target production process. In addition, the quality data acquisition unit 130 may acquire, as a third item (item 3) of the evaluation result, an actual measurement value (for example, target: 100 μm±3%) obtained by measuring the thickness of the "functional film" which is the target product in the target production process.

In addition, the quality data acquisition unit 130 may acquire, as the quality data, feedback data for evaluating the production elements in the target production process on the basis of the quality of the downstream product in the target production process, the feedback data being output from the production management system 100 which manages the downstream production process of producing the downstream product by using the target product as a material. As an example, the quality data acquisition unit 130 in the production management system 100c may acquire, as the feedback data, the feedback data output from the feedback unit 160 of the production management system 100d which manages the production process, which is the downstream production process, in the product manufacturer 10d. Note that, similarly to the feedback data output by itself, such feedback data may include information for identifying a target product identified as a cause of deterioration in the quality of a downstream product, information for identifying a lot of a downstream product of which the quality is estimated to no longer satisfy a predetermined standard due to the target product, information for identifying a lot of a target product corresponding to the lot of the downstream product, information indicating the yield of the downstream product caused by the target product identified as the cause of the deterioration in the quality of the downstream product, and the like. The quality data acquisition unit 130 supplies the acquired quality data to the data recording unit 140.

In step 530, the production management system 100c records data. For example, the data recording unit 140 records the operational data acquired in step 510 and the quality data acquired in step 520 in association with each lot of the target product.

As an example, the data recording unit 140 links the operational data acquired in step 510 so that they are data in the same time zone. Such linking is performed since the acquired operational data may have different output timings for each production element. Next, the data recording unit 140 grasps the start time point and the end time point of the process from the acquired operational data, and classifies the operational data for each lot. Then, the data recording unit 140 records the operational data classified for each lot in association with the quality data acquired for each lot in step 520.

In step 540, the production management system 100c analyzes the data. For example, the analysis unit 150 accesses the data recording unit 140 and refers to the operational data and the quality data recorded in association with each lot of the target product in step 530. Then, the analysis unit 150 analyzes the operational data and the quality data to estimate the influence, which is caused by the production element, on the quality of the target product.

For example, the analysis unit 150 compares and analyzes a plurality of pieces of operational data with which different pieces of quality data are associated. As an example, focusing on lot #2, it can be seen that the value of the feedback data, that is, the yield of the downstream product caused by the target product is reduced. In this case, the analysis unit 150 compares the operational data associated with lot #2 with the operational data associated with one or more other lots (for example, lot #1 or the like). Then, as a result of the comparison, when it is determined that the data regarding the "machine", the "method", and the "man" are similar between the lots while the data regarding the "material" is different between the lots, the analysis unit 150 estimates that the "material" has caused the decrease in the value of the feedback data in lot #2. Furthermore, as a result of the comparison, when it is determined that the property data of the "solvent Y" and the "PET film Z" are similar between the lots while the property data of the "surface coating agent X" is different between the lots, the analysis unit 150 specifies that the "surface coating agent X" in the "material" has caused the decrease in the feedback data in lot #2.

The analysis unit 150 may use, for example, a Mahalanobis distance (MD) in determining the similarity of operational data between the lots. That is, when the MD of the operational data between the lots is equal to or less than a predetermined threshold value, the analysis unit 150 may determine that the operational data are similar between the lots. In addition, when the MD of the operational data between the lots exceeds the predetermined threshold value, the analysis unit 150 may determine that the operational data is different between the lots.

Similarly, focusing on lot #3, it can be seen that the value of the feedback data decreases. In this case, the analysis unit 150 compares the operational data associated with lot #3 with the operational data associated with one or more other lots. Then, as a result of the comparison, when it is determined that the data regarding the "material", the "method", and the "man" are similar between the lots and the data regarding the "machine" is different between the lots, the analysis unit 150 estimates that the "machine" has caused the decrease in the feedback data in lot #3. Furthermore, as a result of the comparison, when it is determined that data regarding a particular device of the "machine" is different between lots, the analysis unit 150 can narrow down and specify specifically which device of the "machine" has caused the decrease in the feedback data in lot #3.

Similarly, focusing on lot #4, it can be seen that the evaluation result of the item 1 is fail. In this case, the analysis unit 150 compares the operational data associated with lot #4 with the operational data associated with one or more other lots. Then, as a result of the comparison, when it is determined that the data regarding the "machine", the "method", and the "man" are similar between the lots and the data regarding the "material" is different between the lots, the analysis unit 150 estimates that the "material" has caused the fail of the item 1 in lot #4. Then, the analysis unit 150 further compares and analyzes the data in order to narrow down specifically which material of the "material" has caused the fail of the item 1 in lot #4. However, there is a case where, as a result of the comparison, the properties of the "surface coating agent X", the "solvent Y", and the "PET film Z" are similar to the same extent between the lots and it may not be possible to specify materials having significantly different properties. In such a case, the analysis unit 150 may estimate the material that has caused the deterioration in the quality of the target product on the basis of which item of the quality data has presented a difference between the lots. That is, in lot #4, the item 1 of the quality data is failed. Herein, the item 1 indicates a result of performing the appearance test on the target product. Therefore, the analysis unit 150 may estimate that the "material" that has caused different results in the appearance test was the "PET film Z" that could most affect the appearance test.

Similarly, focusing on lot #5, it can be seen that the evaluation result of the Item 2 is fail. In this case, the analysis unit 150 compares the operational data associated with lot #5 with the operational data associated with one or more other lots. Then, as a result of the comparison, when it is determined that the data regarding the "material", the "machine", and the "man" are similar between the lots and the data regarding the "method" is different between the lots, the analysis unit 150 estimates that the "method" has caused the fail of the item 2 in lot #5. In addition, the analysis unit 150 may further analyze the data to specify specifically which step of the "method" has caused the fail (F) of the item 2 in lot #5. Also in this case, the analysis unit 150 may estimate the cause of the deterioration in the quality of the target product on the basis of which item of the quality data has presented a difference. As an example, in lot #5, the item 2 is failed (F). Herein, the item 2 indicates a result of performing the reflectance test on the target product. Therefore, the analysis unit 150 may estimate that the "method" that has caused a different result in the reflectance test was a step (for example, a coating step or a drying step of the surface coating agent X, or the like) related to a surface coating layer that could most affect the reflectance test.

Similarly, focusing on lot #6, it can be seen that the item 3 is out of the range of the target value. In this case, the analysis unit 150 compares the operational data associated with lot #6 with the operational data associated with one or more other lots. Then, as a result of the comparison, when it is determined that the data regarding the "material", the "machine", and the "method" are similar between the lots and the data regarding the "man" is different between the lots, the analysis unit 150 estimates that the "man" has caused the item 3 in lot #6 to be out of the range of the target value. In addition, the analysis unit 150 may further analyze the data to specify specifically which one of "men" has caused the item 3 in lot #6 to be out of the target value. Also in this case, the analysis unit 150 may estimate the cause of deterioration in the quality of the target product on the basis of which item of the quality data has presented a difference. As an example, in lot #6, the item 3 is out of the range of the target value. Herein, the item 3 indicates an actual measurement value obtained by measuring the thickness of the target product. Therefore, the analysis unit 150 may estimate that the "man" that has caused different results in the thickness was a schedule (for example, a personnel allocation in a coating process of a mixture of the surface coating agent X and the solvent Y, or the like) related to a surface coating process that could most affect the thickness.

In this manner, the analysis unit 150 can estimate the influence, which is caused by the operation in the target production process, on the quality of the target product by estimating that any one of the "machine", the "method", or the "man" has caused the different results in the quality of the target product. That is, the analysis unit 150 can analyze the operational data and the quality data to estimate the influence, which is caused by the operation in the target production process, on the quality of the target product.

In addition, the analysis unit 150 can estimate the influence, which is caused by the material of the target product, that is, the upstream product, on the quality of the target product by estimating that the "material" has caused the different results in the quality of the target product. That is, the analysis unit 150 can analyze the operational data and the quality data to estimate the influence, which is caused by the upstream product, on the quality of the target product, the upstream product being the product of the upstream production process which is the upstream process of the target production process and serving as the material in the target production process.

In addition, when it is estimated that the "material" has caused the different results in the quality of the target product, the analysis unit 150 can further analyze the operational data and the quality data to specify which of a plurality of upstream products has caused the different results in the quality of the target product. That is, the analysis unit 150 can analyze a plurality of pieces of operational data with which different pieces of quality data are associated, to specify the upstream product that has caused the deterioration in the quality of the target product. The analysis unit 150 supplies the analysis result analyzed in step 540 to the feedback unit 160 and the control information decision unit 170.

In step 550, the production management system 100c outputs the feedback data. For example, on the basis of the analysis result obtained by the analysis of the analysis unit 150 in step 540, the feedback unit 160 outputs feedback data for evaluating the production element in the upstream production process on the basis of the quality of the target product in the upstream production process.

As an example, in step 540, when the analysis unit 150 specifies that the "surface coating agent X" in the "material" has caused the decrease in the feedback data in lot #2, the feedback unit 160 may output, as the feedback data, an identifier "X" for identifying the "surface coating agent X". That is, the feedback unit 160 may output information for identifying the upstream product specified by the analysis unit 150.

In addition, the feedback unit 160 may output, as the feedback data, the lot of the target product for which the feedback data is estimated to be decreased due to the "surface coating agent X", that is, an identifier "#2" for identifying lot #2. That is, the feedback unit 160 may output information for identifying the lot of the target product of which the quality is estimated to no longer satisfy the predetermined standard due to the upstream product specified by the analysis unit 150.

In addition, the feedback unit 160 may access the lot management unit 110 to specify which lot of the "surface coating agent X" has been used as a material to produce lot #2 of the target product. Then, for example, when it is specified that lots #1 to #4 of the target product have been produced by using lot #A of the "surface coating agent X" as the material, the feedback unit 160 may output, as the feedback data, an identifier "#A" for identifying lot #A. That is, the feedback unit 160 may output information for identifying the lot of the upstream product corresponding to the lot of the target product of which the quality is estimated to no longer satisfy the predetermined standard due to the upstream product specified by the analysis unit 150.

Similarly, when the analysis unit 150 specifies in step 540 that the "PET film Z" in the "material" has caused the fail of the item 1 in lot #4, the feedback unit 160 may output, as the feedback data, an identifier "Z" for identifying the "PET film Z" and an identifier "#4" for identifying the lot of the target product for which the item 1 is estimated to have been failed due to the "PET film Z", that is, lot #4. In addition, for example, when it is specified that lots #1 to #5 of the target product have been produced by using lot #B of the "PET film Z" as the material, the feedback unit 160 may output, as the feedback data, an identifier "#B" for identifying lot #B.

In addition, when five lots (lots #1 to #5) of the target product are produced by using lot #B of "PET film Z" as the material, the item 1 in one lot (lot #4) of the target product has been failed due to the "PET film Z" and cannot be supplied to the downstream production process. Thus, the feedback unit 160 may output, as the feedback data, information indicating the yield "80%" of the target product caused by the "PET film Z". In this manner, the feedback unit 160 may output the information indicating the yield of the target product caused by the upstream product specified by the analysis unit 150.

For example, the feedback unit 160 outputs feedback data to the integrated management system 200. When acquiring the feedback data, the integrated management system 200 provides the feedback data to the quality data acquisition unit 130 in the production management system 100 that manages the upstream production process. That is, when acquiring the feedback data from the feedback unit 160 of the production management system 100c, the integrated management system 200 provides the feedback data to the quality data acquisition unit 130 in the production management system 100b. As a result, the feedback unit 160 can provide the feedback data to the upstream side via the integrated management system 200. Similarly to the operational data acquisition unit 120, the feedback unit 160 may be a communication unit, and for example, may supply the feedback data to the integrated management system 200 or another production management system 100 via the communication network. In addition, the feedback unit 160 may be a display (output) unit, or may cause the feedback data to be displayed on a display device or to be printed on paper as a report.

Note that in the above description, a case where the feedback unit 160 supplies the feedback data to the upstream side via the integrated management system 200 has been described as an example, but the present invention is not limited thereto. The feedback unit 160 may provide the feedback data upstream directly without the integrated management system 200 or indirectly.

In this manner, for example, the production management system 100c that manages the production process in the component manufacturer 10c analyzes the data in the target production process and provides the feedback data to the production management system 100c that manages the production process in the to-be-processed material manufacturer 10b that is the upstream production process. Then, the production management system 100b that has acquired the feedback data from the production management system 100c analyzes the data in the target production process, and further provides the feedback data to the production management system 100a that manages the production process in the raw material manufacturer 10a that is the upstream production process. In this manner, by using the production management system 100 and the integrated management system 200 according to the present embodiment, it is possible to realize the chain of quality feedback over the entire supply chain. As a result, according to the production management system 100 and the integrated management system 200 according to the present embodiment, it is possible to share quality over the entire supply chain, thereby optimizing production in the entire supply chain.

Conventionally, a technique for specifying a cause of variation in product performance in the target production process by analysis is known. However, in the conventional technique, such analysis is only performed for the purpose of improving the target production process, and provision of information based on the result analyzed in this manner to another production process is not considered at all. In addition, in general, in a supply chain, a product is supplied from upstream to downstream to satisfy required specifications agreed in advance between a supplier and a buyer. That is, when the required specifications are satisfied, the product can be supplied from the upstream to the downstream, and in the production process on the upstream side, it is not possible to grasp what has occurred on the downstream side due to the product supplied by the upstream side after the product is supplied.

On the other hand, the production management system 100 according to the present embodiment analyzes the operational data and the quality data to estimate the influence, which is caused by the upstream product, on the quality of the target product. Then, on the basis of the result analyzed in this manner, the production management system 100 outputs feedback data for evaluating the production element in the upstream production process on the basis of the quality of the target product in the upstream production process. As a result, according to the production management system 100 according to the present embodiment, the influence of the upstream product applied on the quality of the target product can be fed back to the upstream side in the supply chain to inform the upstream side of the influence.

In addition, the production management system 100 according to the present embodiment analyzes a plurality of pieces of operational data with which different pieces of quality data are associated, to specify the upstream product that has caused the deterioration in the quality of the target product. As a result, according to the production management system 100 according to the present embodiment, it is possible not only to estimate that the "material" has caused the deterioration in the quality of the target product but also to narrow down and specify specifically which material is the cause.

In addition, the production management system 100 according to the present embodiment outputs, as the feedback data, the information for identifying the upstream product specified in this manner, the information for identifying the lot of the target product of which the quality has deteriorated due to the upstream product, the information for identifying the lot of the upstream product corresponding to the lot of the target product, and the information indicating the yield of the target product. As a result, according to the production management system 100 according to the present embodiment, more detailed information can be fed back to the upstream side.

In addition, the production management system 100 according to the present embodiment acquires, as the quality data, the evaluation result of the quality of the target product evaluated in the target production process. As a result, according to the production management system 100 according to the present embodiment, data can be analyzed on the basis of the result of evaluation in the process to be managed by itself. In addition, the production management system 100 according to the present embodiment acquires, as the quality data, the feedback data output in the down-stream production process. As a result, according to the production management system 100 according to the present embodiment, the feedback data for the upstream production process can be output in consideration of the feedback from the downstream side.

In addition, the production management system 100 according to the present embodiment also estimates the influence, which is caused by the operation in the target production process, on the quality of the target product. As a result, according to the production management system 100 according to the present embodiment, it is possible to distinguish whether the deterioration in the quality of the target product is caused by the upstream product or caused by the operation in the own production process. Then, on the basis of such an analysis result, the production management system 100 according to the present embodiment decides information for controlling the production element in the target production process. As a result, according to the production management system 100 according to the present embodiment, the control information can be decided to improve the operation in the own production process. In addition, the production management system 100 according to the present embodiment controls the production element in the target production process on the basis of the control information decided in this manner. As a result, according to the production management system 100 according to the present embodiment, the information decided in this manner can be applied to actual control in the own production process.

Figure 6:
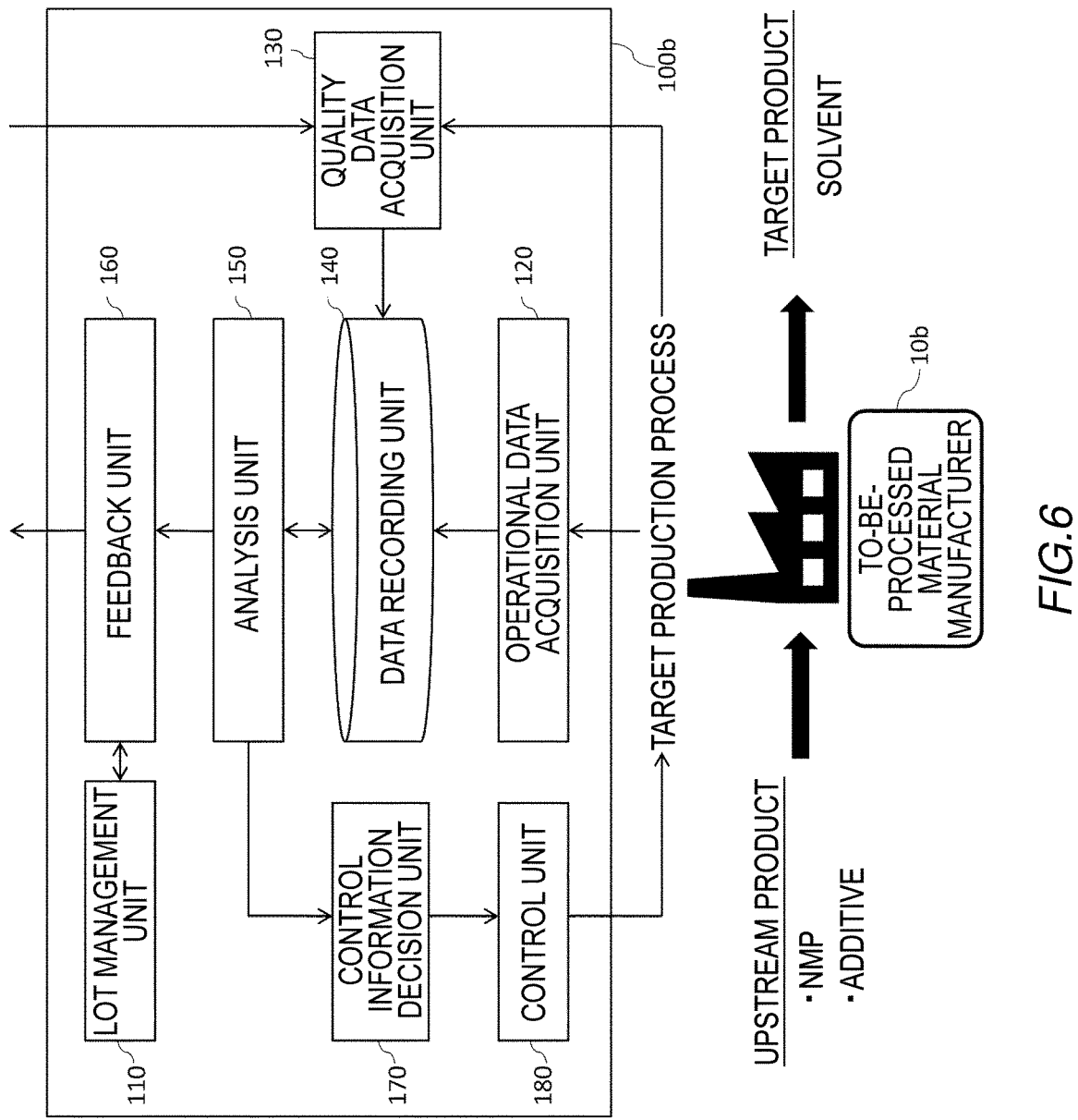
FIG. 6 illustrates an example of a block diagram of a production management system 100b according to the present embodiment.

FIG. 6 illustrates an example of a block diagram of the production management system 100*b* according to the present embodiment. The production management system 100*b* according to the present embodiment acquires and analyzes the operation performance in the target production process and the feedback data from the downstream production process. Then, on the basis of the analysis result, the production management system 100*b* according to the present embodiment decides the control information for control-ling the production element in the target production process. Note that the production management system 100*b* is an example of the production management system 100 on the upstream side, that is, the side to which the quality is fed back in a case where the quality feedback according to the present embodiment is applied to the production manage-ment between the to-be-processed material manufacturer 10*b* and the component manufacturer 10*c*. Therefore, when the quality feedback according to the present embodiment is applied to production management between other processes, other production management systems 100 may be config-ured similarly to the production management system 100*b*. In addition, when both the side which feeds back the quality and the side to which the quality is fed back can be provided, the production management system 100 may be configured to include both the function of the production management system 100*c* described above and the function of the pro-duction management system 100*b* illustrated in this figure.

In this figure, since the production management system 100*b* is illustrated, the production process in the to-be-processed material manufacturer 10*b* is the target production process. In addition, in this figure, since the production process in the to-be-processed material manufacturer 10*b* is the target production process, the production process in the raw material manufacturer 10*a* is the upstream production process. In addition, in this figure, since the production process in the to-be-processed material manufacturer 10*b* is the target production process, the production process in the component manufacturer 10*c* is the downstream production process.

In the present embodiment, for example, the production management system 100*b* is assumed to manage the pro-duction process in the to-be-processed material manufac-turer 10*b* that uses, as main raw materials, "NMP (N-methyl-2-pyrrolidone)" and "additive" supplied from the raw material manufacturer 10*a* to produce a "solvent" and sup-plies the "solvent" to the component manufacturer 10*c* that produces the "functional film". In this case, the "NMP" and the "additive" correspond to the upstream product, the "solvent" corresponds to the target product, and the "func-tional film" corresponds to the downstream product.

Similarly to the production management system 100*c* described above, the production management system 100*b* may be a computer such as a personal computer (PC), a tablet computer, a smartphone, a workstation, a server computer, or a general-purpose computer, or may be a computer system in which a plurality of computers is connected. Such a computer system is also a computer in a broad sense. In addition, the production management system 100*b* may also be implemented by one or more virtual computer environments executable in a computer.

Alternatively, the production management system 100*b* may be a dedicated computer designed for management of a production process, or may be dedicated hardware realized by a dedicated circuit. In addition, when the production management system 100*b* can be connected to the Internet, the production management system 100*b* may be realized by cloud computing.

The block diagram in the production management system 100*b* may be similar to the block diagram in the production management system 100*c* described above. That is, the production management system 100*b* includes the lot man-agement unit 110, the operational data acquisition unit 120, the quality data acquisition unit 130, the data recording unit 140, the analysis unit 150, the feedback unit 160, the control information decision unit 170, and the control unit 180. In FIG. 6, members having the same functions and configura-tions as those in FIG. 3 are denoted by the same reference numerals, and description thereof will be omitted except for differences.

The lot management unit 110 may have a function similar to the above-described function. That is, the lot management unit 110 may manage the identification information for identifying the lot of the upstream product and the informa-tion for identifying the lot of the target product in association with each other.

The operational data acquisition unit 120 may have a function similar to the above-described function. That is, the operational data acquisition unit 120 may acquire the opera-tional data regarding the production element in the target production process as a target among the plurality of pro-duction processes for producing a product from a material.

The quality data acquisition unit 130 may have a function similar to the above-described function. That is, the quality data acquisition unit 130 may acquire, as the quality data indicating the quality of the target product, the feedback data for evaluating the production element in the target produc-tion process on the basis of the quality of the downstream product in the target production process, the feedback data being output from the production management system 100 which manages the downstream production process of producing the downstream product by using, as a material, the target product which is the product of the target production process. In addition, the quality data acquisition unit 130 may acquire, as the quality data, the evaluation result of the quality of the target product evaluated in the target production process.

The data recording unit 140 may have a function similar to the above-described function. That is, the data recording unit 140 may record the operational data and the quality data in association with each lot of the target product.

The analysis unit 150 may have a function similar to the above-described function. That is, the analysis unit 150 may analyze the operational data and the quality data to estimate the influence, which is caused by the upstream product, on the quality of the target product, the upstream product being the product of the upstream production process which is the upstream process of the target production process and serving as the material in the target production process. In addition, the analysis unit 150 may analyze the operational data and the quality data to estimate the influence, which is caused by the operation in the target production process, on the quality of the target product. In addition, the analysis unit 150 may further analyze the operational data and the feedback data in addition to the above-described functions. Then, the analysis unit 150 may estimate a relationship between the change in the operational data and the change in the feedback data. This will be described below in detail.

The feedback unit 160 may have a function similar to the above-described function. That is, on the basis of the analysis result by the analysis unit 150, the feedback unit 160 may output feedback data for evaluating the production element in the upstream production process on the basis of the quality of the target product in the upstream production process.

The control information decision unit 170 may have a function similar to the above-described function. That is, the control information decision unit 170 may decide the control information for controlling the production element in the target production process on the basis of the analysis result by the analysis unit 150. In addition, in addition to the above-described functions, the control information decision unit 170 may further decide the control information on the basis of the relationship, which estimated by the analysis unit 150, between the change in the operational data and the change in the feedback data. As an example, the control information decision unit 170 may predict, on the basis of the estimated relationship, the feedback data in a case where the control information is changed, and decide the control information on the basis of the prediction result. At this time, the control information decision unit 170 may decide the control information to reduce the cost related to the operation of the target production process within a range in which the predicted feedback data satisfies a predetermined standard. In addition, the control information decision unit 170 may decide the control information to reduce the energy consumption amount related to the operation of the target production process within a range in which the predicted feedback data satisfies a predetermined standard. This will also be described below in detail.

The control unit 180 may have a function similar to the above-described function. That is, the control unit 180 may control the production element in the target production process on the basis of the control information decided by the control information decision unit 170.

FIG. 7 illustrates an example of data recorded by the production management system 100b according to the present embodiment. As illustrated in this figure, the production management system 100b records the operational data and the quality data in the data recording unit 140 in association with each lot of the target product.

The production management system 100b may record, as the operational data, each operational data indicating performance regarding "4M", that is, the "material", the "machine", the "method", and the "man" in the target production process, for example. As an example, the production management system 100b may record, as operational data regarding the "material", data obtained by inspecting each of the properties of "NMPI" and "additive B" in the target production process.

In addition, the production management system 100b may record, as the quality data, evaluation results in the plurality of items (item 1, item 2, and the like) and feedback (FB) data. Herein, the evaluation results for the plurality of items may be the results of evaluating the quality of the target product for the plurality of items in the target production process. That is, the production management system 100b may record, as the quality data, the quality evaluation result of the target product evaluated in the target production process, herein, the "solvent".

As an example, the production management system 100b may record, as the evaluation result, data indicating a result of performing a test on the target product in the target production process, that is, whether the test has been passed (P) or failed (F). In addition, the production management system 100b may record, as the evaluation result, an actual measurement value obtained by measuring the characteristic of the target product in the target production process.

In addition, the production management system 100b may record, as the feedback data, feedback data output from the production management system 100 which manages the downstream production process, for example. As an example, the production management system 100b may record, as quality data, feedback data output from the production management system 100c which manages the production process in the component manufacturer 10c which uses, as a source material, a to-be-processed material such as the "solvent" which is the target product to produce the "functional film" which is the downstream product. Note that, in this figure, a case where the production management system 100b records, as the feedback data, data indicating the yield of the downstream product caused by the target product is illustrated as an example.

That is, in this figure, for example, for lots #A to #E, a case is illustrated in which as a result of evaluating the target product in the target production process, the item 1 was passed (P) and the item 2 was within a range of the target value (for example, 200±10%), and thus as a result of the target product being supplied from the target production process to the downstream production process, the yield of the downstream product caused by the target product was fed back from the downstream production process. On the other hand, for other lots #F to #G, a case is illustrated in which as a result of evaluating the target product in the target production process, the item 1 was failed (F) or the item 2 was out of the range of the target value, and thus the target product was not supplied from the target production process to the downstream production process. Note that in this case, there is no feedback data from the downstream production process for these lots.

The production management system 100b according to the present embodiment records, for example, a plurality of pieces of operational data with which different pieces of quality data are associated as illustrated in this figure. Then, on the basis of the analysis result, the production management system 100*b* according to the present embodiment analyzes these data and decides control information for controlling the production element in the target production process. This will be described in detail by using a flow.

Figure 8:
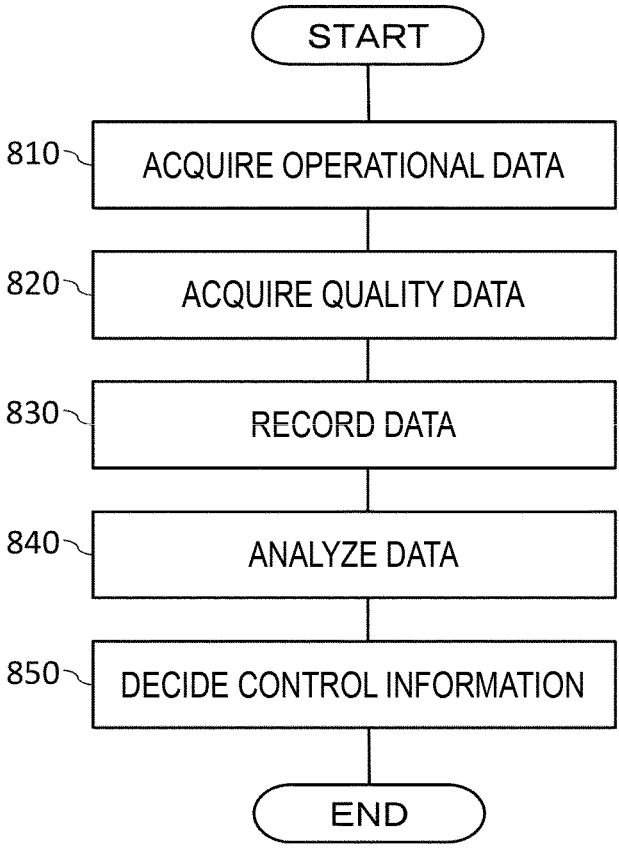
FIG. 8 illustrates an example of a flow in which the production management system 100b according to the present embodiment controls a production element on the basis of feedback data.

FIG. 8 illustrates an example of a flow in which the production management system 100*b* according to the present embodiment controls the production element on the basis of the feedback data.

In step 810, the production management system 100*b* acquires operational data. Since the processing of step 810 is similar to that of step 510, the description thereof will be omitted.

In step 820, the production management system 100*b* acquires quality data. For example, the quality data acquisition unit 130 acquires, via the communication network, quality data indicating the quality of the target product, which is the product of the target production process, for each lot of the target product.

Herein, the quality data acquisition unit 130 may acquire, as the quality data, the evaluation result of the quality of the target product evaluated in the target production process. As an example, the quality data acquisition unit 130 may acquire, as a first item (item 1) of the evaluation result, data indicating a result of performing a density inspection on the "solvent" which is the target product in the target production process, that is, whether the test has been passed (P) or failed (F). In addition, the quality data acquisition unit 130 may acquire, as the second item (item 2) of the evaluation result, an actual measurement value (for example, target: 200 cp±5%) obtained by measuring the viscosity of the "solvent" which is the target product in the target production process.

In addition, the quality data acquisition unit 130 may acquire, as the quality data indicating the quality of the target product, the feedback data for evaluating the production element in the target production process on the basis of the quality of the downstream product in the target production process, the feedback data being output from the production management system 100 which manages the downstream production process of producing the downstream product by using, as a material, the target product which is the product of the target production process. As an example, the quality data acquisition unit 130 in the production management system 100*b* may acquire, as the feedback data, the feedback data output from the feedback unit 160 of the production management system 100*c* which manages the production process, which is the downstream production process, in the component manufacturer 10*c*. Note that, as described above, such feedback data may include information for identifying the target product identified as the cause of the deterioration in the quality of the downstream product, information for identifying the lot of the downstream product of which the quality is estimated to no longer satisfy the predetermined standard due to the target product, information for identifying the lot of the target product corresponding to the lot of the downstream product, and information indicating the yield of the downstream product caused by the target product identified as the cause of the deterioration in the quality of the downstream product.

In step 830, the production management system 100*b* records data. Since the processing of step 830 is similar to that of step 530, the description thereof will be omitted.

In step 840, the production management system 100*b* analyzes the data. For example, the analysis unit 150 compares and analyzes a plurality of pieces of operational data with which different pieces of quality data are associated. In step 840, similarly to step 540, the analysis unit 150 may estimate the influence, which is caused by the operation in the target production process, on the quality of the target product. In addition, the analysis unit 150 may analyze the operational data and the quality data to estimate the influence, which is caused by the upstream product, on the quality of the target product, the upstream product being the product of the upstream production process which is the upstream process of the target production process and serving as the material in the target production process. The analysis unit 150 may further estimate the relationship between the change in the operational data and the change in the feedback data by comparing and analyzing a plurality of pieces of operational data with which different pieces of feedback data are associated.

As an example, the analysis unit 150 compares, for example, the operational data associated with lot #B with the operational data associated with one or more other lots (for example, lot #A or the like). Then, as a result of the comparison, when it is determined with respect to the "material" of lot #B that the impurity concentration of the additive B is higher than those of other lots and the feedback data has decreased, it may be estimated that the increase in the impurity concentration of the additive B contributes to the decrease in the feedback data.

In addition, for example, the analysis unit 150 compares the operational data associated with lot #C with the operational data associated with one or more other lots. Then, as a result of the comparison, when it is determined with respect to the "machine" of lot #C that the feedback data has not decreased even though the washing performed on a pulverizing device in other lots has not been performed, it may be estimated that the non-execution of the washing on the pulverizing device does not contribute to the decrease in the feedback data.

In addition, for example, the analysis unit 150 compares the operational data associated with lot #D with the operational data associated with one or more other lots. Then, as a result of the comparison, when it is determined with respect to the "method" of lot #D that a calcination (heat treatment) temperature is lower than those of other lots and the feedback data has decreased, it may be estimated that the lowering of the calcination temperature contributes to the decrease in the feedback data.

In addition, for example, the analysis unit 150 compares the operational data associated with lot #E with the operational data associated with one or more other lots. Then, as a result of the comparison, when it is determined with respect to the "man" of lot #E that the feedback data has not decreased although the worker involved in the raw material mixing process is a new worker while the worker is an expert in other lots, it may be estimated that the allocation of the new worker in the mixing process does not contribute to the decrease in the feedback data. The analysis unit 150 supplies the analysis result analyzed in step 840 to the feedback unit 160 and the control information decision unit 170.

In response to this, on the basis of the analysis result obtained by the analysis of the analysis unit 150 in step 840, the feedback unit 160 outputs feedback data for evaluating the production element in the upstream production process on the basis of the quality of the target product in the upstream production process. Since this is similar to the process in step 550, the description thereof will be omitted.

In step 850, the production management system 100*b* decides the control information. For example, the control information decision unit 170 decides the control information for controlling the production element in the target production process on the basis of the analysis result obtained by the analysis of the analysis unit 150 in step 840. At this time, the control information decision unit 170 may decide the control information on the basis of the relationship, which is estimated by the analysis unit 150 in step 840, between the change in the operational data and the change in the feedback data.

As an example, when it is estimated that the increase in the impurity concentration of the additive B contributes to the decrease in the feedback data, the control information decision unit 170 may decide the control information to add a process of washing the additive B as the preprocessing of the "material".

In addition, when it is estimated that the non-execution of the washing on the pulverizing device does not contribute to the decrease in the feedback data, the control information decision unit 170 may predict the feedback data in a case where the washing cycle for the pulverizing device is reduced. Then, when the predicted feedback data satisfies a predetermined standard, the control information decision unit 170 may decide the control information to reduce the washing cycle for the pulverizing device.

In addition, when it is estimated that the decrease in the calcination temperature contributes to the decrease in the feedback data, the control information decision unit 170 may estimate that the calcination temperature is a key factor that may affect the quality of the target product, and decide the control information not to change the calcination temperature.

In addition, when it is estimated that the allocation of the new worker in the mixing process does not contribute to the decrease in the feedback data, the control information decision unit 170 may predict the feedback data in a case where the worker to be allocated in the mixing process is changed from the expert to the new worker. Then, when the predicted feedback data satisfies a predetermined standard, the control information decision unit 170 may decide the control information to change the worker to be allocated in the mixing process from the expert to the new worker.

In addition, the control information decision unit 170 may decide the control information to reduce the cost related to the operation of the target production process within a range in which the predicted feedback data satisfies a predetermined standard. That is, by using, as an objective function, the cost related to the operation of the target production process, the control information decision unit 170 may decide the control information to minimize the objective function within a range in which the predicted feedback data satisfies a predetermined standard.

In addition, the control information decision unit 170 may decide the control information to reduce the energy consumption amount related to the operation of the target production process within a range in which the predicted feedback data satisfies a predetermined standard. That is, by using, as an objective function, the energy consumption amount related to the operation of the target production process, the control information decision unit 170 may decide the control information to minimize the objective function within a range in which the predicted feedback data satisfies a predetermined standard. The control information decision unit 170 supplies the decided control information to the control unit 180.

In response to this, the control unit 180 controls the production element in the target production process on the basis of the control information decided by the control information decision unit 170 in step 850. At this time, when the control information is supplied from the control information decision unit 170, the control unit 180 may actively control the production element in the target production process according to the control information. Alternatively or additionally, the control unit 180 may passively control the production element in the target production process according to an instruction from a worker who has viewed the control information output by the control information decision unit 170.

In this manner, the production management system 100 according to the present embodiment acquires and analyzes the operation performance in the target production process and the feedback data from the downstream production process. Then, on the basis of the analysis result, the production management system 100 according to the present embodiment decides the control information for controlling the production element in the target production process. As a result, according to the production management system 100 according to the present embodiment, it is possible to decide the control information related to the operation of the target production process in consideration of the feedback from the downstream production process of producing the downstream product by using the target product as the material.

In addition, the production management system 100 according to the present embodiment estimates the relationship between the change in the operational data and the change in the feedback data, and decides the control information on the basis of the estimated relationship. As a result, according to the production management system 100 according to the present embodiment, it is possible to decide the control information related to the operation of the target production process on the basis of the performance of how the feedback data specifically changes when the operational data changes.

In addition, the production management system 100 according to the present embodiment predicts the feedback data in a case where the control information is changed, and decides the control information to reduce the cost and the energy consumption amount related to the operation of the target production process on the basis of the prediction result. As a result, according to the production management system 100 according to the present embodiment, it is possible to optimize the operation in the target production process in consideration of the prediction result based on the performance.

In addition, the production management system 100 according to the present embodiment controls the production element in the target production process on the basis of the decided control information. As a result, according to the production management system 100 according to the present embodiment, the information decided in this manner can be applied to actual control in the own production process.

Figure 9:
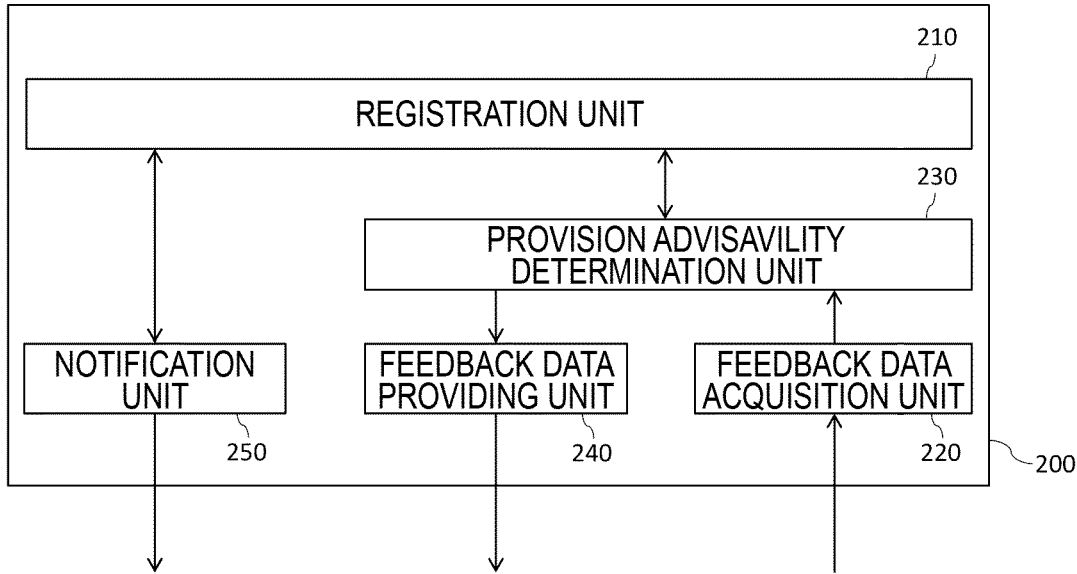
FIG. 9 illustrates an example of a block diagram of the integrated management system 200 according to the present embodiment.

FIG. 9 illustrates an example of a block diagram of the integrated management system 200 according to the present embodiment. The integrated management system 200 according to the present embodiment registers the plurality of production management systems 100 in association with a sequence of a plurality of production processes. Then, the integrated management system 200 according to the present embodiment provides the feedback data acquired from the downstream production management system 100 to the upstream production management system 100 on the basis of the sequence.

The integrated management system 200 may be a computer such as a personal computer (PC), a tablet computer, a smartphone, a workstation, a server computer, or a general-purpose computer, or may be a computer system in which a plurality of computers are connected. Such a computer system is also a computer in a broad sense. In addition, the integrated management system 200 may also be implemented by one or more virtual computer environments executable in a computer. Alternatively, the integrated management system 200 may be a dedicated computer designed for providing feedback data, or may be dedicated hardware realized by a dedicated circuit. In addition, when the integrated management system 200 can be connected to the Internet, the integrated management system 200 may be realized by cloud computing.

The integrated management system 200 includes a registration unit 210, a feedback data acquisition unit 220, a provision advisability determination unit 230, a feedback data providing unit 240, and a notification unit 250. Note that these blocks are functional blocks that are functionally separated from each other, and do not necessarily have to be matched with actual device configurations. In other words, in this figure, a unit shown by one block does not necessarily have to be configured by one device. Also, in this figure, units shown by separate blocks do not necessarily have to be configured by separate devices The registration unit 210 registers the plurality of production management systems 100 that each manages a target production process as a target among the plurality of production processes for producing a product from a material in association with a sequence of the plurality of production processes.

The feedback data acquisition unit 220 acquires, from at least one of the plurality of production management systems 100, feedback data for evaluating the production element in the upstream production process, which is the upstream process of the target production process, on the basis of the quality of the target product, which is the product of the target production process, in the upstream production process.

The feedback data acquisition unit 220 may be, for example, a communication unit, and acquires feedback data via the communication network. Such a communication network may be a network which connects a plurality of computers. For example, the communication network may be a global network in which a plurality of computer networks are interconnected, and may be, as an example, the Internet using the Internet protocol. Instead, the communication network may be realized by a dedicated line. Note that, in the above description, a case where the feedback data acquisition unit 220 acquires the feedback data via the communication network has been described as an example, but the present invention is not limited thereto. For example, the feedback data acquisition unit 220 may acquire the feedback data via another means, such as a user input or various memory devices, different from the communication network. The feedback data acquisition unit 220 supplies the acquired feedback data to the provision advisability determination unit 230.

The provision advisability determination unit 230 accesses the registration unit 210 and refers to the information registered in the registration unit 210. Then, the provision advisability determination unit 230 determines whether to provide the feedback data to the upstream production management system. At this time, when the production management system 100 of the provider of the feedback data permits the provision of the feedback data, the provision advisability determination unit 230 may determine to provide the feedback data to the upstream production management system 100. In addition, when the upstream production management system 100 is registered in the registration unit 210, the provision advisability determination unit 230 may determine to provide the feedback data to the upstream production management system 100. This will be described below in detail. When determining to provide the feedback data to the upstream production management system 100, the provision advisability determination unit 230 supplies the feedback data to the feedback data providing unit 240.

The feedback data providing unit 240 acquires the feedback data supplied from the provision advisability determination unit 230. Then, the feedback data providing unit 240 provides the feedback data to the upstream production management system 100 specified on the basis of the sequence. That is, the feedback data providing unit 240 provides, on the basis of the sequence, the feedback data to the upstream production management system which manages the upstream production process.

The notification unit 250 notifies the production management system 100 registered in the registration unit 210 whether the provision of the feedback data is permitted. As an example, the notification unit 250 accesses the registration unit 210 and refers to the information registered in the registration unit 210. Then, when the downstream production management system 100 which manages the downstream production process which is the downstream process of the registered production management system 100 is registered in the registration unit 210 and the downstream production management system 100 permits the provision of the feedback data, the notification unit 250 may notify the registered production management system 100 that the provision of the feedback data is permitted. In addition, when the downstream production management system 100 which manages the downstream production process which is the downstream process of the registered production management system 100 is registered in the registration unit 210 and the downstream production management system 100 does not permit the provision of the feedback data, the notification unit 250 may request the downstream production management system 100 to permit the provision of the feedback data. In addition, when the downstream production management system 100 which manages the downstream production process which is the downstream process of the registered production management system 100 is registered in the registration unit 210 and the downstream production management system 100 does not permit the provision of the feedback data, the notification unit 250 may notify the registered production management system 100 that the provision of the feedback data is not permitted. In addition, when the downstream production management system 100 which manages the downstream production process which is the downstream process of the registered production management system 100 is not registered in the registration unit 210, the notification unit 250 may notify the registered production management system 100 that the downstream production management system 100 is unregistered. This will also be described below in detail.

FIG. 10 illustrates an example of the data registered by the integrated management system 200 according to the present embodiment. In the integrated management system 200, the registration unit 210 registers the plurality of production management systems 100 that each manages a target production process among the plurality of production processes for producing a product from a material in association with a sequence of the plurality of production processes. For example, the registration unit 210 manages the sequence of the plurality of production processes in ascending order from the upstream to the downstream in the supply chain to be continuous numbers. That is, for example, when there are four production processes in the supply chain, management is performed such that the sequence number becomes "1→2→3→4" from the upstream to the downstream. Then, the registration unit 210 registers the production management system 100 that manages each production process in the supply chain in association with the sequence of the plurality of production processes.

That is, the registration unit 210 registers the production management system 100*a* that manages the production process in the raw material manufacturer 10*a* in association with the sequence number "1". In addition, the registration unit 210 registers the production management system 100*b* that manages the production process in the to-be-processed material manufacturer 10*b* in association with the sequence number "2". In addition, the registration unit 210 registers the production management system 100*c* that manages the production process in the component manufacturer 10*c* in association with the sequence number "3". In addition, the registration unit 210 registers the production management system 100*d* that manages the production process in the product manufacturer 10*d* in association with the sequence number "4".

Note that, in this figure, a case where the production management systems 100*a*, 100*c*, and 100*d* of the production management systems 100 have been registered in the integrated management system 200, whereas the production management system 100*b* is unregistered in the integrated management system 200 is illustrated as an example.

In addition, when registering the production management system 100, the registration unit 210 also registers provision permission information indicating whether each production management system 100 is permitted to provide the feedback data to the upstream production management system 100. For example, when acquiring, from the production management system 100*c*, information indicating permission to provide the feedback data to the upstream production management system 100, the registration unit 210 may register the provision permission information of the production management system 100*c* as "0 (provision is permitted)". In addition, when acquiring, from the production management system 100*d*, information indicating that the provision of the feedback data to the upstream production management system 100 is not permitted, the registration unit 210 may register the provision permission information of the production management system 100*d* as "x (provision is not permitted)". In this manner, when the production management system 100 is registered, the integrated management system 200 registers the provision permission information indicating the permission to provide the feedback data for each production management system 100.

Figure 11:
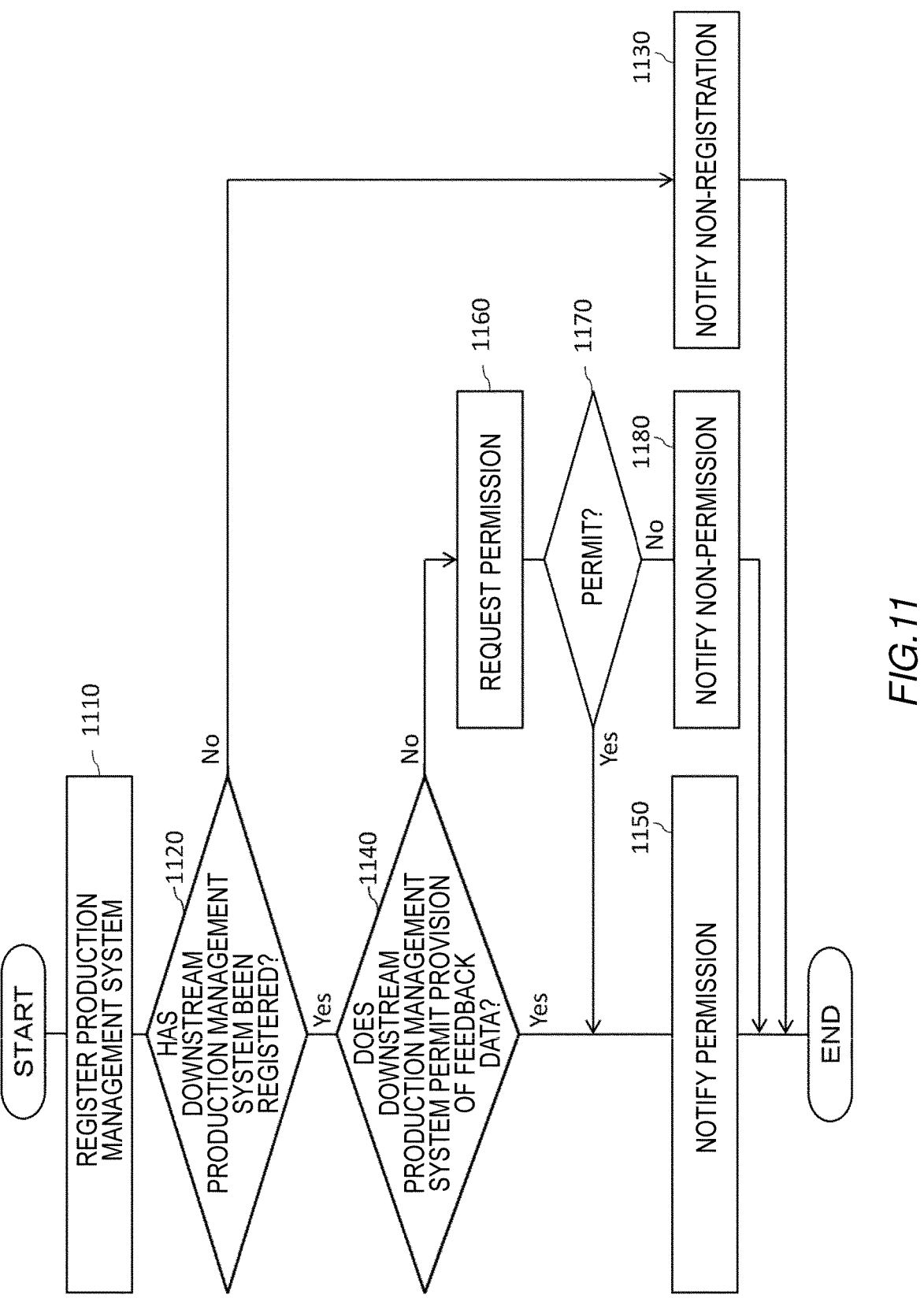
FIG. 11 illustrates an example of a flow in which the integrated management system 200 according to the present embodiment registers the production management system 100.

FIG. 11 illustrates an example of a flow in which the integrated management system 200 according to the present embodiment registers the production management system 100.

In step 1110, the integrated management system 200 registers the production management system 100. For example, the integrated management system 200 receives a registration request from the unregistered production management system 100 via the communication network. Such a registration request may include information for identifying the production management system 100 and the provision advisability information of feedback data. When the registration request is received from the unregistered production management system 100, the registration unit 210 registers the identification information of the production management system 100 and the provision permission information in association with the sequence. That is, the registration unit 210 registers the plurality of production management systems 100 for each managing a target production process as a target among the plurality of production processes for producing a product from a material in association with a sequence of the plurality of production processes. As an example, when the registration request is received from the production management system 100*b*, the registration unit 210 registers "100*b*", which is the identification information of the production management system 100*b*, and the provision permission information "O (provision is permitted)" in association with the sequence number "2".

In step 1120, the production management system 100 determines whether the downstream production management system 100 has been registered. For example, the notification unit 250 accesses the registration unit 210 and refers to the information registered in the registration unit 210. Then, the notification unit 250 determines whether the downstream production management system 100 serving as the provider of the feedback data to the registered production management system 100 has been registered. As an example, when the production management system 100*b* is registered in association with the sequence number "2", the notification unit 250 determines whether the production management system 100 is registered in association with the next sequence number, that is, the sequence number "3".

When it is determined in step 1120 that the downstream production management system 100 has not been registered, in step 1130, the integrated management system 200 notifies the registered production management system 100 that the downstream production management system is unregistered. For example, when the production management system 100 is not registered in association with the sequence number "3", the notification unit 250 notifies the production management system 100*b* that the downstream production management system is unregistered.

On the other hand, when it is determined in step 1120 that the downstream production management system 100 has been registered, in step 1140, the integrated management system 200 determines whether the downstream production management system 100 permits the provision of the feedback data. For example, when the production management system 100*c* has been registered in the sequence number "3", the notification unit 250 refers to the provision permission information of the production management system 100*c* to determine whether the downstream production management system 100 permits the provision of the feedback data.

When it is determined in step 1140 that the downstream production management system 100 permits the provision of the feedback data, in step 1150, the integrated management system 200 notifies the registered production management system 100 that the provision of the feedback data is permitted. For example, when the provision permission information of the production management system 100*c* is "O (provision is permitted)", the notification unit 250 notifies the production management system 100*b* that the provision of the feedback data is permitted.

On the other hand, when it is determined in step 1140 that the downstream production management system 100 does not permit the provision of the feedback data, in step 1160, the integrated management system 200 requests the downstream production management system 100 to permit the provision of the feedback data. For example, when the provision permission information of the production management system 100*c* is "x (provision is not permitted)" or "unregistered", the notification unit 250 requests the production management system 100*c* to permit the provision of the feedback data.

In step 1170, the integrated management system 200 determines whether the provision of the feedback data is permitted by the downstream production management system 100. For example, the notification unit 250 determines whether the provision of the feedback data is permitted depending on whether an acknowledgment (ACK) is received from the production management system 100c in response to the request.

When it is determined in step 1170 that the provision of the feedback data is permitted, in step 1150, the integrated management system 200 notifies the registered production management system 100 that the provision of the feedback data is permitted. For example, when the ACK is received from the production management system 100c in response to the request, the notification unit 250 notifies the production management system 100b that the provision of the feedback data is permitted.

On the other hand, when it is determined in step 1170 that the provision of the feedback data is not permitted, in step 1180, the integrated management system 200 notifies the registered production management system 100 that the provision of the feedback data is not permitted. For example, when a negative acknowledge (NACK) is received from the production management system 100c or the ACK is not received within a predetermined period in response to the request, the notification unit 250 notifies the production management system 100b that the provision of the feedback data is not permitted.

In this manner, when the downstream production management system 100 which manages the downstream production process which is the downstream process of the registered production management system 100 is registered in the registration unit 210 (step 1120: Yes) and the downstream production management system 100 permits the provision of the feedback data (step 1140: Yes), the notification unit 250 may notify the registered production management system 100 that the provision of the feedback data is permitted. In addition, when the downstream production management system 100 which manages the downstream production process which is the downstream process of the registered production management system 100 is registered in the registration unit 210 (step 1120: Yes) and the downstream production management system 100 does not permit the provision of the feedback data (step 1140: No), the notification unit 250 may request the downstream production management system 100 to permit the provision of the feedback data. In addition, when the downstream production management system 100 which manages the downstream production process which is the downstream process of the registered production management system 100 is registered in the registration unit 210 (Step 1120: Yes), and the downstream production management system 100 does not permit the provision of the feedback data (Step 1140: No, Step 1170: No), the notification unit 250 may notify the registered production management system 100 that the provision of the feedback data is not permitted. In addition, when the downstream production management system 100 which manages the downstream production process which is the downstream process of the registered production management system 100 is not registered in the registration unit 210 (step 1120: No), the notification unit 250 may notify the registered production management system 100 that the downstream production management system 100 is unregistered. In this manner, the notification unit 250 notifies the production management system 100 registered in the registration unit 210 whether the provision of the feedback data is permitted.

Figure 12:
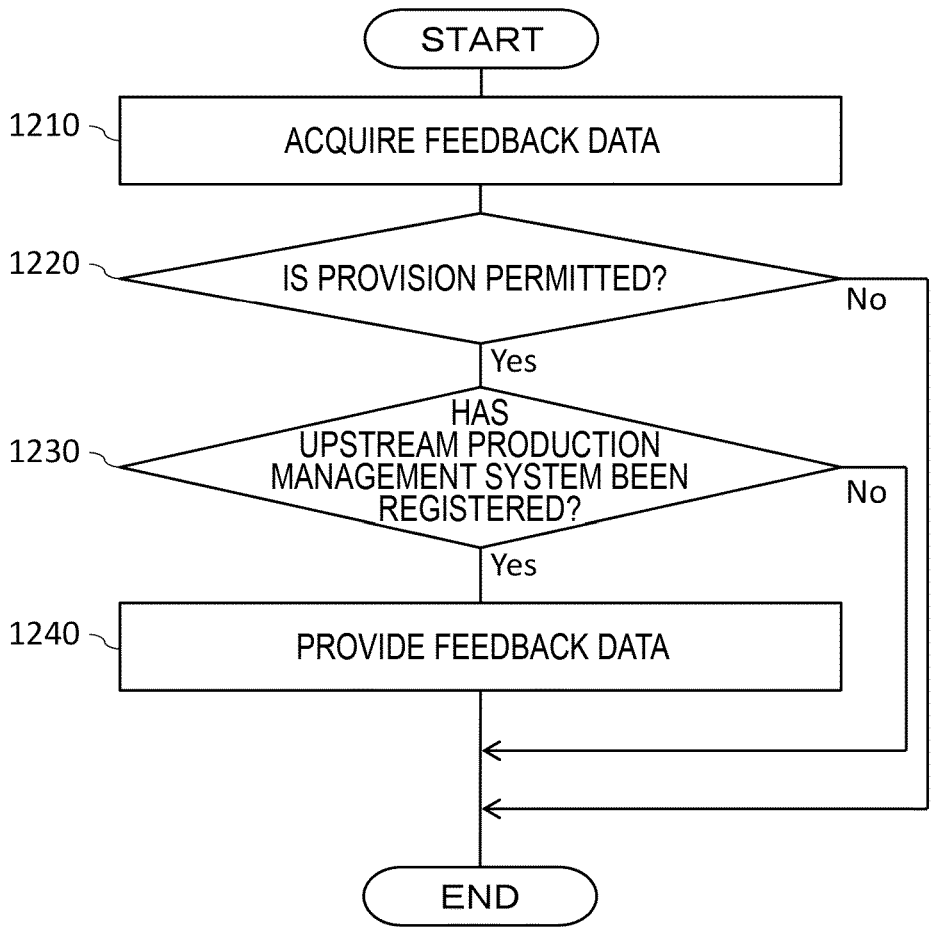
FIG. 12 illustrates an example of a flow in which the integrated management system 200 according to the present embodiment provides feedback data.

FIG. 12 illustrates an example of a flow in which the integrated management system 200 according to the present embodiment provides the feedback data.

In step 1210, the integrated management system 200 acquires the feedback data. For example, the feedback data acquisition unit 220 acquires, from at least one of the plurality of production management systems 100, the feedback data for evaluating the production element in the upstream production process, which is the upstream process of the target production process, on the basis of the quality of the target product, which is the product of the target production process, in the upstream production process. As an example, the feedback data acquisition unit 220 acquires, from the production management system 100c which manages the production process in the component manufacturer 10c, the feedback data for evaluating the production element in the to-be-processed material manufacturer 10b on the basis of the quality of the "functional film" in the production process in the to-be-processed material manufacturer 10b. The feedback data acquisition unit 220 supplies the acquired feedback data to the provision advisability determination unit 230.

In step 1220, the integrated management system 200 determines whether the provision of the feedback data is permitted. For example, the provision advisability determination unit 230 determines whether the production management system 100 of the provider of the feedback data supplied in step 1210 permits the provision of the feedback data. As an example, the provision advisability determination unit 230 refers to the provision permission information in the production management system 100c of the provider of the feedback data to determine whether the provision of the feedback data is permitted.

When it is determined in step 1220 that the provision of the feedback data is not permitted, the integrated management system 200 ends the flow. As an example, when the provision permission information of the production management system 100c which is the provider of the feedback data is "x (provision is not permitted)", the provision advisability determination unit 230 determines that the provision of the feedback data is not permitted and ends the flow.

On the other hand, when it is determined in step 1220 that the provision of the feedback data is permitted, in step 1230, the integrated management system 200 determines whether the upstream production management system 100 serving as the recipient of the feedback data has been registered. For example, when the provision permission information of the production management system 100c registered in association with the sequence number "3" is "O (provision is permitted)", it is determined whether the production management system 100 is registered in association with the immediately previous sequence number, that is, the sequence number "2".

When it is determined in step 1230 that the upstream production management system 100 has not been registered, the integrated management system 200 ends the flow. For example, when the production management system 100 is not registered in association with the sequence number "2", the provision advisability determination unit 230 ends the flow.

On the other hand, when it is determined in step 1230 that the upstream production management system 100 is registered, the integrated management system 200 provides the feedback data in step 1240. For example, when the production management system 100b is registered in association with the sequence number "2", the provision advisability determination unit 230 determines to provide the feedback data to the upstream production management system 100*b* and supplies the feedback data to the feedback data providing unit 240. Then, the feedback data providing unit 240 provides the feedback data to the upstream production management system 100*b* specified on the basis of the sequence in this manner. That is, the feedback data providing unit 240 provides, on the basis of the sequence, the feedback data to the upstream production management system 100 which manages the upstream production process.

In this manner, when the production management system 100 of the provider of the feedback data permits the provision of the feedback data (Step 1220: Yes), the provision advisability determination unit 230 may determine to provide the feedback data to the upstream production management system 100. In addition, when the upstream production management system 100 is registered in the registration unit 210 (step 1230: Yes), the provision advisability determination unit 230 may determine to provide the feedback data to the upstream production management system 100. In this manner, the provision advisability determination unit 230 determines whether to provide the feedback data to the upstream production management system 100.

In this manner, the integrated management system 200 according to the present embodiment registers the plurality of production management systems 100 in association with the sequence of the plurality of production processes. Then, the integrated management system 200 according to the present embodiment provides the feedback data acquired from the downstream production management system 100 to the upstream production management system 100 on the basis of the sequence. As a result, according to the integrated management system 200 of the present embodiment, the feedback data can be provided to the target production management system 100 in the supply chain in which a plurality of players exist.

In addition, the integrated management system 200 according to the present embodiment determines whether to provide the feedback data to the upstream production management system. As a result, according to the integrated management system 200 according to the present embodiment, the provision of the feedback data can be determined according to, for example, the provision intention of the downstream side which is the provider of the feedback data and the registration status of the upstream side which is the recipient of the feedback data.

In addition, the integrated management system 200 according to the present embodiment notifies whether the provision of the feedback data to the registered production management system 100 is permitted. As a result, according to the integrated management system 200 of the present embodiment, for example, it is possible to inform, by notification, the registered production management system 100 that the provision of the feedback data is permitted, that the provision of the feedback data is not permitted, and that the downstream production management system 100 that is the provider of the feedback data is unregistered.

Figure 13:
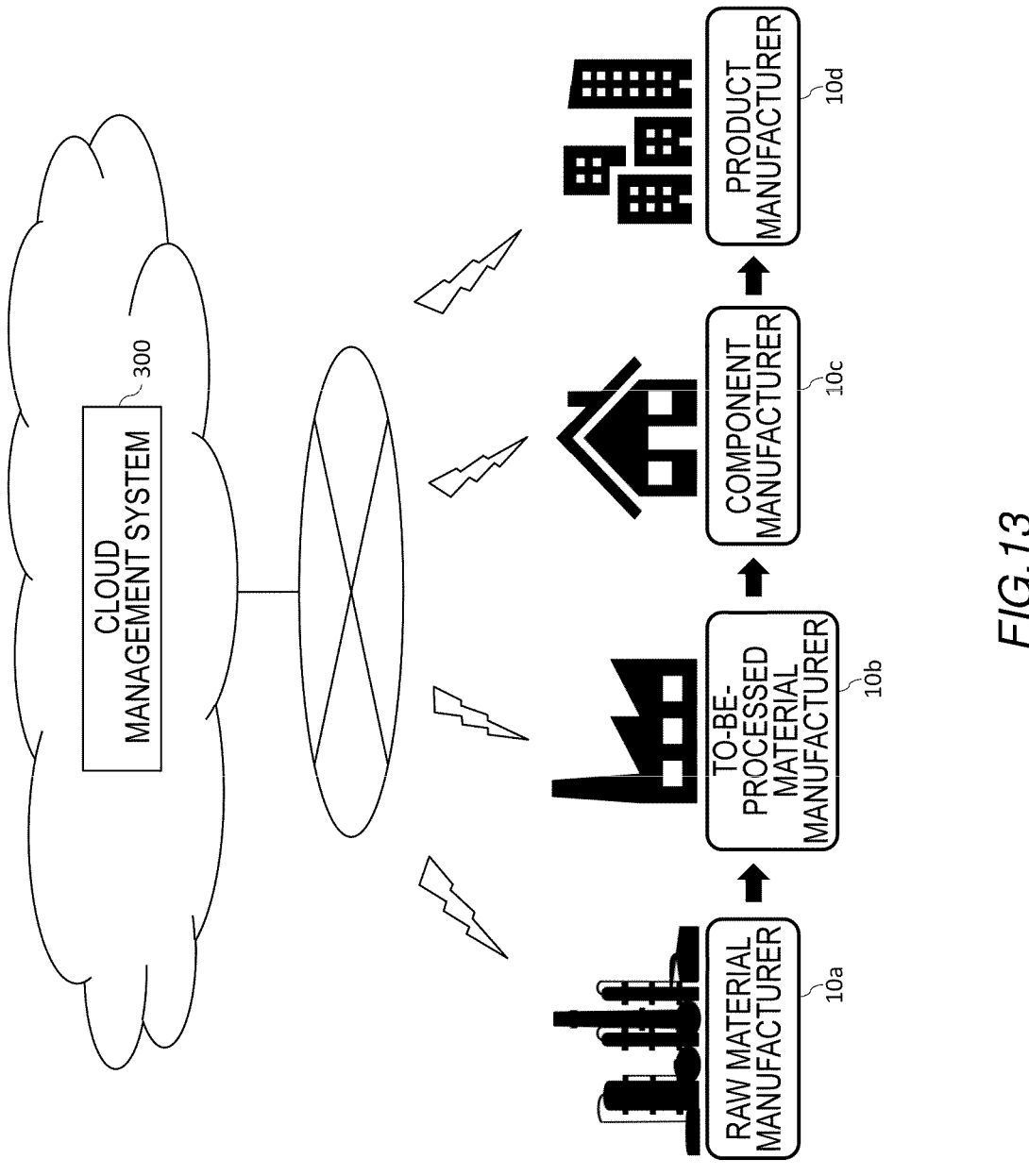
FIG. 13 illustrates an example of a block diagram for managing a supply chain by using a cloud management system 300 according to a modification of the present embodiment.

FIG. 13 illustrates an example of a block diagram for managing the supply chain by using a cloud management system 300 according to a modification of the present embodiment. In the above description, a case where the production management system 100 and the integrated management system 200 are configured as separate systems such that the production management system is provided in the facility of each manufacturer 10 and the integrated management system is provided as a cloud has been described as an example. However, the production management system 100 and the integrated management system 200 may be integrally configured as the cloud management system 300, and the cloud management system 300 may provide the above-described functions of the production management systems 100*a* to 100*d* and the above-described function of the integrated management system 200 and collectively manage the production in the entire supply chain.

The present invention may be described by referring to flowcharts and block diagrams, wherein blocks may represent (1) steps of processes in which operations are performed or (2) sections of apparatuses responsible for performing operations. Certain steps and sections may be implemented by dedicated circuitry, programmable circuitry supplied with computer readable instructions stored on a computer readable storage medium, and/or processors supplied with computer readable instructions stored on a computer readable storage medium. Dedicated circuitry may include digital and/or analog hardware circuits and may include integrated circuits (IC) and/or discrete circuits. For example, programmable circuitry may include reconfigurable hardware circuits including logical AND, OR, XOR, NAND, NOR, and other logical operations, flip-flops, registers, and memory elements, such as field-programmable gate arrays (FPGA), programmable logic arrays (PLA), etc.

A computer readable storage medium may include any tangible device that can store instructions for execution by a suitable device, such that the computer readable storage medium having instructions stored therein comprises an article of manufacture including instructions which can be executed to create means for performing operations specified in the flowcharts or block diagrams. Examples of the computer-readable medium may include an electronic storage medium, a magnetic storage medium, an optical storage medium, an electromagnetic storage medium, a semiconductor storage medium, and the like. More detailed examples of the computer readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer readable instructions to create means for performing operations specified in the flowcharts or block diagrams. Examples of the processor include a computer processor, a processing unit, a microprocessor, a digital signal processor, a controller, a microcontroller, or the like.

Figure 14:
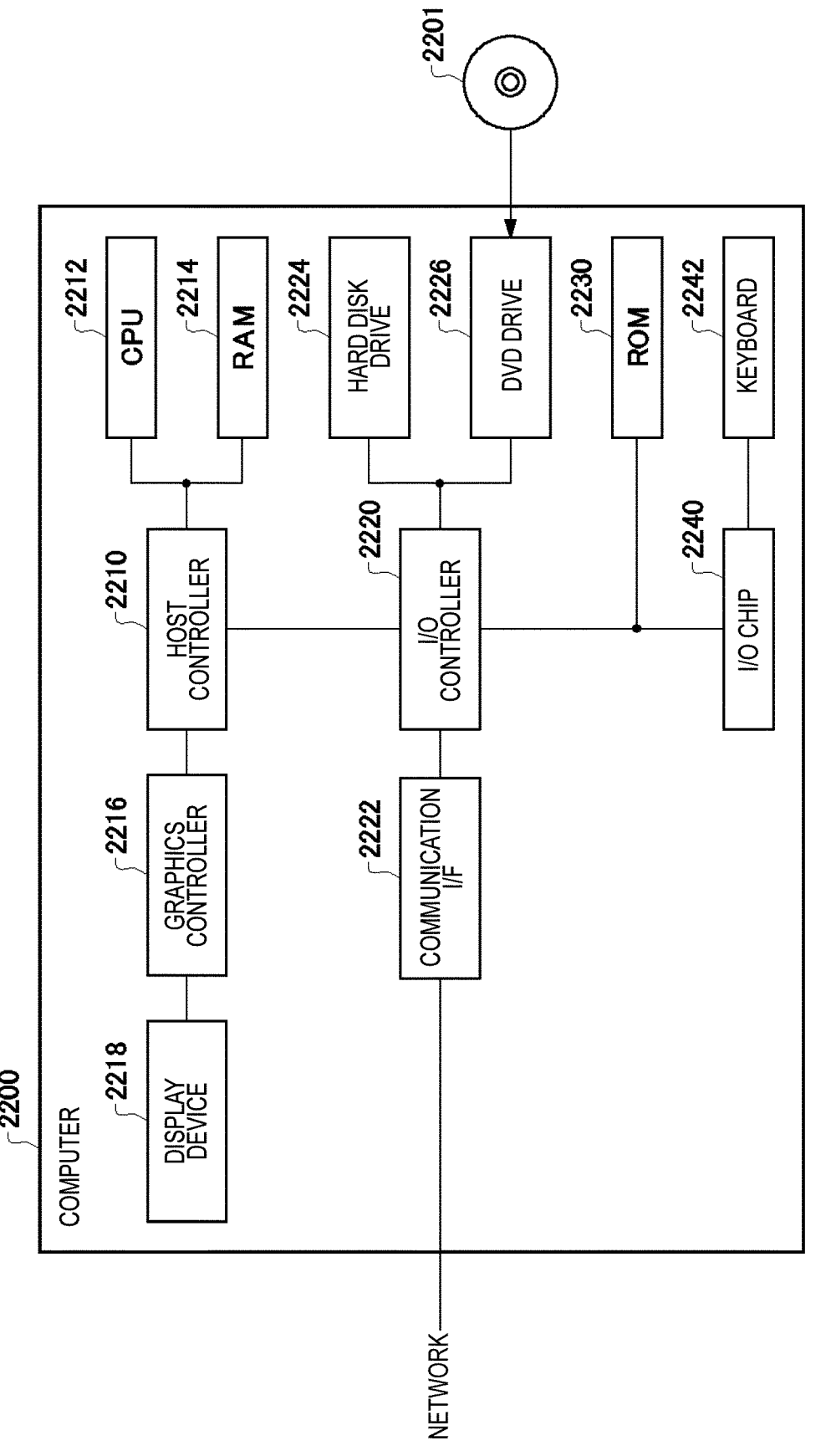
FIG. 14 illustrates an example of a computer 2200 in which a plurality of aspects of the present invention may be embodied in whole or in part.

FIG. 14 illustrates an example of a computer 2200 in which a plurality of aspects of the present invention may be embodied in whole or in part. A program installed in the computer 2200 may cause the computer 2200 to function as an operation associated with the apparatuses according to the embodiments of the present invention or as one or more sections of the apparatuses, or may cause the operation or the one or more sections to be executed, and/or may cause the computer 2200 to execute a process according to the embodiments of the present invention or a stage of the process. Such programs may be executed by a CPU 2212 to cause the computer 2200 to perform certain operations associated with some or all of the blocks in the flowcharts and block diagrams described in the present specification.

The computer 2200 according to the present embodiment includes the CPU 2212, a RAM 2214, a graphic controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphic controller 2216 acquires image data generated by the CPU 2212 in a frame buffer or the like provided in the RAM 2214 or in itself, such that the image data is displayed on the display device 2218.

The communication interface 2222 communicates with other electronic devices via a network. The hard disk drive 2224 stores programs and data used by the CPU 2212 within the computer 2200. The DVD-ROM drive 2226 reads a program or data from the DVD-ROM 2201 and provides the program or data to the hard disk drive 2224 via the RAM 2214. The IC card drive reads programs and data from an IC card, and/or writes programs and data into the IC card.

The ROM 2230 stores therein boot programs and the like executed by the computer 2200 at the time of activation, and/or programs that depend on the hardware of the computer 2200. The input/output chip 2240 may also connect various input/output units to the input/output controller 2220 via parallel ports, serial ports, keyboard ports, mouse ports, or the like.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above described various types of hardware resources. The apparatus or method may be configured by implementing operations or processing of information according to use of the computer 2200.

For example, in a case where communication is performed between the computer 2200 and an external device, the CPU 2212 may execute a communication program loaded in the RAM 2214 and instruct the communication interface 2222 to perform communication processing on the basis of a process described in the communication program.

Under the control of the CPU 2212, the communication interface 2222 reads transmission data stored in a transmission buffer processing area provided in a recording medium such as the RAM 2214, the hard disk drive 2224, the DVD-ROM 2201, or the IC card, transmits the read transmission data to the network, or writes reception data received from the network in a reception buffer processing area or the like provided on the recording medium.

In addition, the CPU 2212 may cause the RAM 2214 to read all or a necessary part of a file or database stored in an external recording medium such as the hard disk drive 2224, the DVD-ROM drive 2226 (DVD-ROM 2201), the IC card, or the like, and may execute various types of processing on data on the RAM 2214. Next, the CPU 2212 writes back the processed data to the external recording medium.

Various types of information, such as various types of programs, data, tables, and databases, may be stored in the recording medium to undergo information processing. The CPU 2212 may execute various types of processing on the data read from the RAM 2214, including various types of operations, information processing, conditional determination, conditional branching, unconditional branching, information retrieval/replacement, and the like, which are described throughout the present disclosure and designated by a command sequence of a program, and writes back the results to the RAM 2214. Further, the CPU 2212 may retrieve information in a file, a database, or the like in the recording medium. For example, in a case where a plurality of entries each having the attribute value of a first attribute associated with the attribute value of a second attribute is stored in the recording medium, the CPU 2212 may retrieve the plurality of entries for an entry matching the condition in which the attribute value of the first attribute is designated, read the attribute value of the second attribute stored in the entry, and thereby acquire the attribute value of the second attribute associated with the first attribute satisfying the predefined condition.

The programs or software modules described above may be stored in a computer readable medium on or near the computer 2200. In addition, a recording medium such as a hard disk or a RAM provided in a server system connected to a dedicated communication network or the Internet can be used as a computer readable medium, thereby providing a program to the computer 2200 via the network.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

Note that the operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 manufacturer
10*a* raw material manufacturer

10*b* to-be-processed material manufacturer
10*c* component manufacturer
10*d* product manufacturer
100 production management system
110 lot management unit
120 operational data acquisition unit
130 quality data acquisition unit
140 data recording unit
150 analysis unit
160 feedback unit
170 control information decision unit
180 control unit
200 integrated management system
210 registration unit
220 feedback data acquisition unit
230 provision advisability determination unit
240 feedback data providing unit
250 notification unit
300 cloud management system
2200 computer
2201 DVD-ROM
2210 host controller
2212 CPU
2214 RAM
2216 graphic controller
2218 display device
2220 input/output controller
2222 communication interface
2224 hard disk drive
2226 DVD-ROM drive
2230 ROM
2240 input/output chip
2242 keyboard.

What is claimed is:

1. A production management system comprising at least one processor, wherein:
the at least one processor acquires operational data regarding a production element produced in a target production process;
the target production process is one of a plurality of production processes for producing a product;
the at least one processor acquires feedback data for evaluating the production element in the target production process on a basis of quality of a downstream product from a downstream production process;
the downstream production process is downstream from the target production process;
the feedback data is quality data indicating quality of a target product which is a product of the target production process;
the feedback data is output from a downstream production management system that manages the downstream production process;
the downstream production process produces the downstream product using the target product as an input material to the downstream production process;
the at least one processor analyzes the operational data and the feedback data to generate an analysis result;
the at least one processor determines control information for controlling the target production process on a basis of the analysis result; and
the at least one processor controls the production element in the target production process on a basis of the control information determined by the at least one processor.

2. The production management system according to claim 1, wherein the at least one processor estimates a relationship between a change in the operational data and a change in the feedback data, and
the at least one processor determines the control information on a basis of the relationship estimated by the at least one processor.

3. The production management system according to claim 2, wherein the at least one processor predicts a predication result on a basis of the relationship estimated by the at least one processor and determines the control information on a basis of a prediction result.

4. The production management system according to claim 3, wherein the at least one processor determines the control information to reduce a cost related to an operation of the target production process within a range in which the feedback data predicted by the at least one processor satisfies a predetermined standard.

5. The production management system according to claim 3, wherein the at least one processor determines the control information to reduce an energy consumption amount related to an operation of the target production process within a range in which the feedback data predicted by the at least one processor satisfies a predetermined standard.

6. The production management system according to claim 3, wherein the feedback data includes information indicating a yield of the downstream product caused by the target product specified as a cause of deterioration in the quality of the downstream product.

7. The production management system according to claim 2, wherein the feedback data includes information indicating a yield of the downstream product caused by the target product specified as a cause of deterioration in the quality of the downstream product.

8. The production management system according to claim 2, wherein the at least one processor acquires, as the quality data, an evaluation result of the quality of the target product evaluated in the target production process.

9. The production management system according to claim 2, wherein the at least one processor analyzes the operational data and the quality data to estimate an influence, which is caused by an upstream product, on the quality of the target product, the upstream product being a product of an upstream production process which is an upstream process of the target production process and serving as a material in the target production process.

10. The production management system according to claim 2, wherein the at least one processor analyzes the operational data and the quality data to estimate an influence, which is caused by an operation in the target production process, on the quality of the target product.

11. The production management system according to claim 1, wherein the feedback data includes information indicating a yield of the downstream product caused by the target product specified as a cause of deterioration in the quality of the downstream product.

12. The production management system according to claim 1, wherein the at least one processor acquires, as the quality data, an evaluation result of the quality of the target product evaluated in the target production process.

13. The production management system according to claim 1, wherein the at least one processor analyzes the operational data and the quality data to estimate an influence, which is caused by an upstream product, on the quality of the target product, the upstream product being a product of an upstream production process which is an upstream process of the target production process and serving as a material in the target production process.

14. The production management system according to claim 13, wherein the at least one processor outputs, on a basis of the analysis result, the feedback data for evaluating the production element in the upstream production process on a basis of the quality of the target product in the upstream production process.

15. The production management system according to claim 1, wherein the at least one processor analyzes the operational data and the quality data to estimate an influence, which is caused by an operation in the target production process, on the quality of the target product.

16. A production management method comprising:

acquiring operational data regarding a production element produced in a target production process, wherein the target production process is one of a plurality of production processes for producing a product;

acquiring feedback data for evaluating the production element in the target production process on a basis of quality of a downstream product from a downstream production process, wherein the downstream production process is downstream from the target production process, wherein the feedback data is quality data indicating quality of a target product which is a product of the target production process, wherein the feedback data is output from a downstream production management system that manages the downstream production process, and wherein the downstream production process produces the downstream product using the target product as an input material to the downstream production process;

analyzing the operational data and the feedback data to generate an analysis result;

determining control information for controlling the target production process on a basis of the analysis result; and controlling the production element in the target production process on a basis of the control information.

17. A non-transitory computer readable medium having stored thereon a production management program that, when executed by a computer, causes the computer to function as:

an operational data acquisition unit configured to acquire operational data regarding a production element produced in a target production process, wherein the target production process is one of a plurality of production processes for producing a product;

a quality data acquisition unit configured to acquire feedback data for evaluating the production element in the target production process on a basis of quality of a downstream product from a downstream production process, wherein the downstream production process is downstream from the target production process, wherein the feedback data is quality data indicating quality of a target product which is a product of the target production process, wherein the feedback data is output from a downstream production management system that manages the downstream production process, and wherein the downstream production process produces the downstream product using the target product as an input material to the downstream production process;

an analysis unit configured to analyze the operational data and the feedback data to generate an analysis result;

a control information decision unit configured to determine control information for controlling the target production process on a basis of the analysis result; and a control unit configured to control the production element in the target production process on a basis of the control information.

* * * * *